US011181398B2

(12) United States Patent
Inuzuka et al.

(10) Patent No.: US 11,181,398 B2
(45) Date of Patent: Nov. 23, 2021

(54) ROTATION ANGLE DETECTION DEVICE

(71) Applicant: DENSO CORPORATION, Kariya (JP)

(72) Inventors: Yoshinori Inuzuka, Kariya (JP); Yoshiyuki Kono, Kariya (JP); Hidekazu Watanabe, Kariya (JP); Tomoyuki Takiguchi, Kariya (JP); Takasuke Ito, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/924,353

(22) Filed: Jul. 9, 2020

(65) Prior Publication Data
US 2020/0340834 A1 Oct. 29, 2020

Related U.S. Application Data

(63) Continuation of application No. PCT/JP2019/000717, filed on Jan. 11, 2019.

(30) Foreign Application Priority Data

Jan. 16, 2018 (JP) .............................. JP2018-004646
Aug. 9, 2018 (JP) .............................. JP2018-150395

(51) Int. Cl.
*G01D 5/244* (2006.01)
*G01D 5/245* (2006.01)

(52) U.S. Cl.
CPC ........... *G01D 5/2448* (2013.01); *G01D 5/245* (2013.01)

(58) Field of Classification Search
CPC ............ G01D 5/12; G01D 5/14; G01D 5/142; G01D 5/145; G01D 5/24471; G01D 5/2448; G01D 5/245; G01D 3/02
See application file for complete search history.

(56) References Cited

U.S. PATENT DOCUMENTS

| | | | |
|---|---|---|---|
| 6,356,073 B1 * | 3/2002 | Hamaoka ................ | G01D 5/145 324/207.2 |
| 2004/0061495 A1 * | 4/2004 | Shimomura ........... | G01D 5/145 324/207.25 |
| 2007/0126419 A1 * | 6/2007 | Kubota .................. | G01D 3/022 324/207.25 |
| 2011/0175600 A1 | 7/2011 | Jerance et al. | |
| 2014/0103911 A1 * | 4/2014 | Honda ..................... | G01D 5/14 324/207.2 |

* cited by examiner

*Primary Examiner* — Huy Q Phan
*Assistant Examiner* — David B Frederiksen
(74) *Attorney, Agent, or Firm* — Nixon & Vanderhye P.C.

(57) ABSTRACT

A rotation angle detection device for detecting a rotation angle of a rotating body includes a magnet disposed to rotate together with the rotating body, a magnetic portion provided in a ring shape radially outward of the magnet, a plurality of gaps being formed in the magnetic portion at a plurality of locations along a circumferential direction, and a magnetic detection unit arranged in a particular gap of the plurality of gaps. The magnetic detection unit is located at a detection position, a width of the particular gap in the tangential direction at the detection position is defined as a detection position gap width, a width of the particular gap in the tangential direction at a position radially outward of the detection position is defined as a tangential width, and the tangential width is narrower than the detection position gap width.

24 Claims, 21 Drawing Sheets

ROTATION ANGLE DETECTION DEVICE

CROSS REFERENCE TO RELATED APPLICATIONS

The present application is a continuation application of International Patent Application No. PCT/JP2019/000717 filed on Jan. 11, 2019, which designated the U.S. and claims the benefit of priority from Japanese Patent Application No. 2018-4646 filed on Jan. 16, 2018, and Japanese Patent Application No. 2018-150395 filed on Aug. 9, 2018, the disclosures of all of which are incorporated herein by reference.

TECHNICAL FIELD

The present disclosure relates to a rotation angle detection device.

BACKGROUND

Conventionally, rotation angle detection devices are known to include a magnetic detection unit disposed radially outward with respect to a magnet that rotates with a rotating body, and known to detect a tangential magnetic flux component and a radial magnetic flux component of the magnetic field to determine a rotation angle of the rotating body based on the detected values.

SUMMARY

A rotation angle detection device according to one aspect of the present disclosure for a rotating body includes a magnet having poles arranged along a radial direction perpendicular to a rotation axis of the rotating body, the magnet being disposed to rotate together with the rotating body, a magnetic portion provided in a ring shape radially outward of the magnet, a plurality of gaps being formed in the magnetic portion at a plurality of locations along a circumferential direction, and a magnetic detection unit arranged in a particular gap of the plurality of gaps, the magnetic detection unit being configured to detect a tangential magnetic flux component in a tangential direction and a radial magnetic flux component in the radial direction of a magnetic field. The magnetic detection unit is located at a detection position, a width of the particular gap in the tangential direction at the detection position is defined as a detection position gap width, a width of the particular gap in the tangential direction at a position radially outward of the detection position is defined as a tangential width, and the tangential width is narrower than the detection position gap width.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

Figure 1:
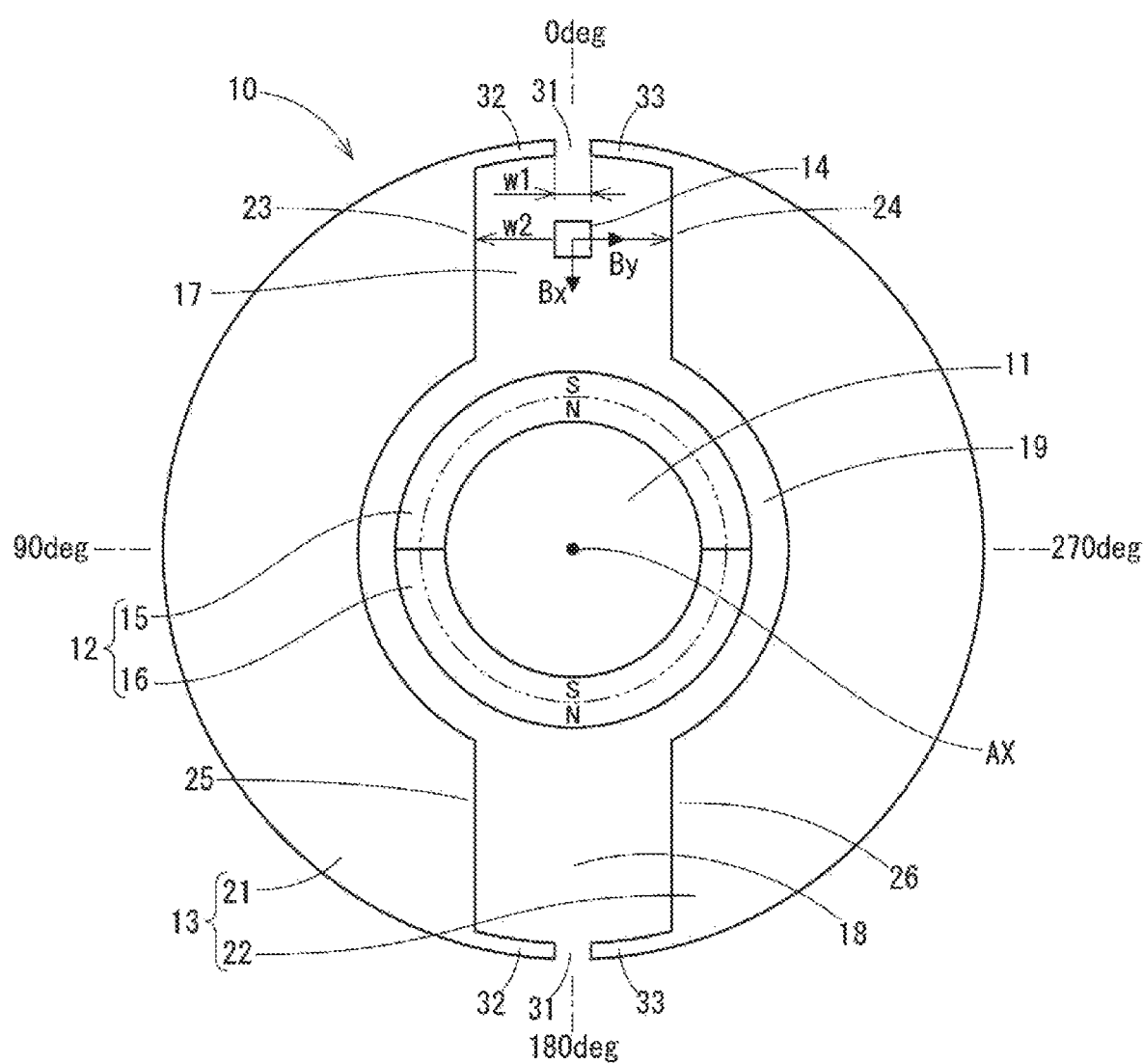
FIG. 1 is a schematic diagram schematically showing a rotation angle detection device according to a first embodiment.

Various embodiments will be described with reference to the drawings. In the embodiments, components which are substantially similar to each other are denoted by the same reference numerals and redundant description thereof is omitted. The drawings showing the structure of the device are schematically drawn for easy understanding of the configuration. The dimensions, angles and dimensional ratios in the drawings are not necessarily limiting.

First Embodiment

In the field of rotation angle detection devices, there is a concern that if a magnetic detection unit is disposed in an open magnetic field, the magnetic detection unit may be easily affected by magnetic field disturbances. Even if a wall is provided around the magnetic detection unit, the influence of magnetic field disturbances may not be sufficiently reduced, and detection accuracy may be adversely affected.

In this regard, FIG. 1 shows a rotation angle detection device 10 according to the first embodiment. The rotation angle detection device 10 is a device that detects the rotation angle of a rotating body 11, and includes a magnet 12, a magnetic portion 13, and a magnetic detection unit 14. The rotation angle signal from the magnetic detection unit 14 is transmitted to an external ECU (Electronic Control Unit) or the like (not shown).

In the following description, directions perpendicular to the rotation axis AX of the rotating body 11 are referred to as the "radial direction". Directions tangent to a circle centered on the rotation axis AX in the cross section of the rotating body 11 are referred to as "tangential direction". Further, the rotation direction of the rotating body 11 is simply referred to as "rotation direction". In addition, when "rotation angle" is used in this disclosure, it means the rotation angle of the rotating body 11.

The magnet 12 has poles arranged along the radial direction of the rotating body 11. These poles includes a north pole and a south pole. In the first embodiment, the magnet 12 includes a first magnet portion 15 and a second magnet portion 16 that are arc-shaped along the rotation direction. The N pole and the S pole are arranged in the thickness direction of the first magnet portion 15 and the second magnet portion 16. The first magnet portion 15 is fixed to one side surface of the rotating body 11. The second magnet portion 16 is fixed to the other side surface of the rotating body 11. The magnet 12 rotates together with the rotating body 11.

The magnetic portion 13 forms a magnetic circuit through which the magnetic flux of the magnet 12 flows, and is arranged around the magnet 12, i.e., in a ring shape outward of the magnet 12 in the radial direction. The magnetic portion 13 has gaps 17 and 18 at a plurality of positions along the circumferential direction. The magnetic portion 13 is radially spaced apart from the magnet 12. Specifically, an annular gap 19 is formed between the magnet 12 and the magnetic portion 13. In the first embodiment, the magnetic portion 13 includes a first magnetic body 21 and a second magnetic body 22 that are arc-shaped along the rotation direction. The first magnetic body 21 is arranged on one side in the radial direction with respect to the magnet 12. The second magnetic body 22 is provided on the opposite side of the magnet 12 from the first magnetic body 21. A gap 17 is formed between one circumferential end portion 23 of the first magnetic body 21 and the other circumferential end portion 24 of the second magnetic body 22. A gap 18 is formed between the other circumferential end portion 25 of the first magnetic body 21 and one circumferential end portion 26 of the second magnetic body 22. The magnetic portion 13 is integrally held together by, for example, a fixing member (not shown).

The first magnetic body 21 and the second magnetic body 22 are arranged point-symmetrically to each other with respect to the rotation axis AX. The gap 17 and the gap 18 are formed point-symmetrically to each other with respect to the rotation axis AX. That is, the gap 17 and the gap 18 have the same shape and are located at diametrically opposite positions as each other with respect to the rotation axis AX.

The magnetic detection unit 14 is disposed in the gap 17 within the magnetic field formed by the magnet 12. The magnetic detection unit 14 is configured to detect a tangential component of the magnetic flux density of the magnetic field (hereinafter, a "tangential magnetic flux component") and a radial component of the magnetic flux density of the magnetic field (hereinafter, a "radial magnetic flux component") at the location of the magnetic detection unit 14. The gap 17 is a particular gap of one of the gaps 17 and 18. Hereinafter, the gap 17 may be referred to as "particular gap 17" where appropriate. The magnetic detection unit 14, similar to the magnetic portion 13, is integrally held together by the fixing member or the like.

Figure 2:
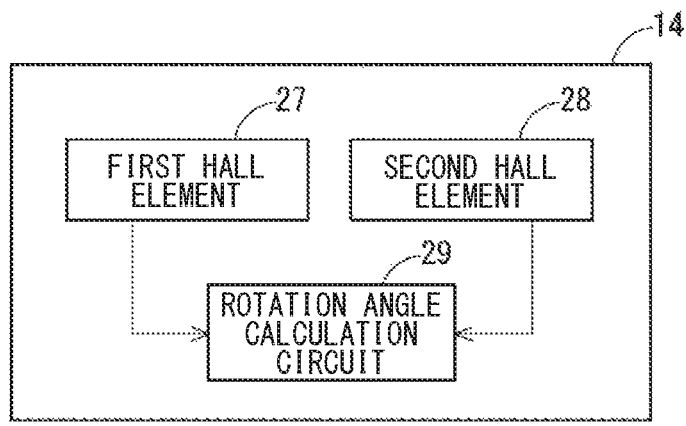
FIG. 2 is a block diagram illustrating a magnetic detection unit according to the first embodiment.

In the first embodiment, the magnetic detection unit 14 includes a first Hall element 27, a second Hall element 28, a rotation angle calculation circuit 29, and the like as shown in FIG. 2.

Figure 3:
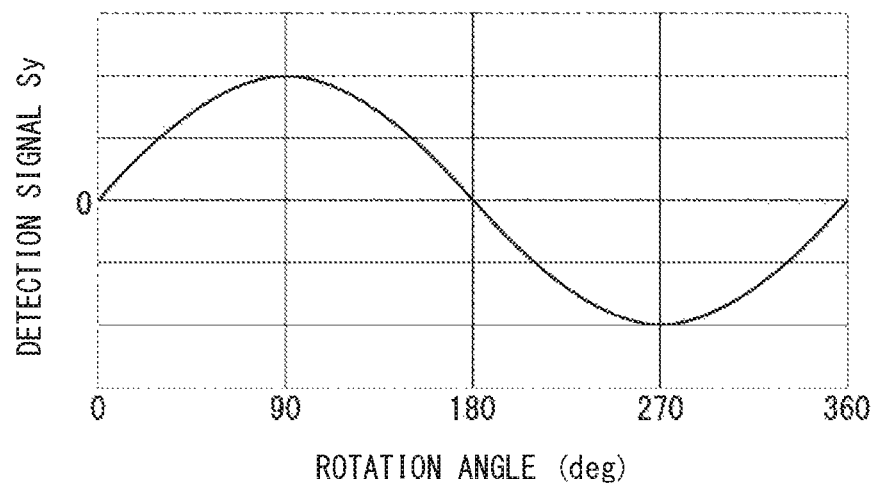
FIG. 3 is a diagram showing a relationship between rotation angle of a rotating body and a detection signal of a first Hall element in the first embodiment.
Figure 4:
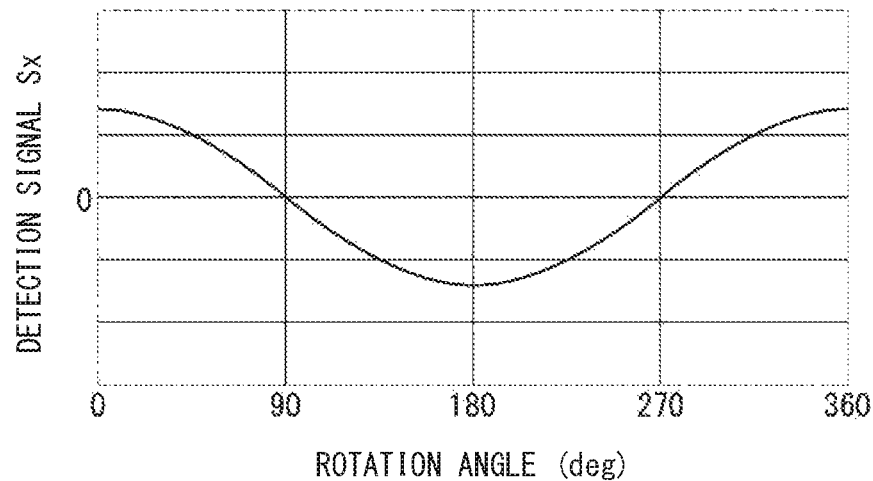
FIG. 4 is a diagram illustrating a relationship between rotation angle of a rotating body and a detection signal of a second Hall element in the first embodiment.

The first Hall element 27 detects the radial magnetic flux component of the magnetic field at the position where the magnetic detection unit 14 is disposed (hereinafter, appropriately referred to as a "detection position"). The second Hall element 28 detects the tangential magnetic flux component of the magnetic field at the detection position. The first Hall element 27 and the second Hall element 28 are arranged such that the directions of their detection surfaces are offset from each other by 90°. The second Hall element 28 outputs a detection signal Sy corresponding to the tangential magnetic flux component, as shown in FIG. 3. The relationship between rotation angle and the detection signal Sy is a Sin waveform. The first Hall element 27 outputs a detection signal Sx corresponding to the radial magnetic flux component, as shown in FIG. 4. The relationship between the rotation angle and the detection signal Sx is a Cos waveform. The detection signal Sy and the detection signal Sx have a phase difference of 90° from each other. Returning to FIG. 2, the rotation angle calculation circuit 29 performs an arc tangent calculation based on the detection signal Sy and the detection signal Sx to calculate a 360° rotation angle of the rotating body 11.

Next, features of the particular gap 17 will be described. The particular gap 17 has a narrow portion 31 radially outward with respect to the magnetic detection unit 14. The tangential width w1 of the narrow portion 31 is smaller than the detection position gap width w2. The detection position gap width w2 is the tangential direction width of the particular gap 17 at the detection position. That is, the particular gap 17 is formed such that the tangential width w1 at a predetermined position radially outward of the detection position is smaller than the detection position gap width w2 at the detection position. In the first embodiment, the predetermined position is the outermost position in the radial direction of the particular gap 17.

Specifically, the narrow portion 31 of the particular gap 17 is formed between two protrusions 32 and 33. The protrusions 32 and 33 are formed radially outward of the detection position, and are formed to project along the tangential direction. That is, the first magnetic body 21 forms the protrusion 32, which protrudes toward the second magnetic body 22, at a radial position corresponding to the narrow portion 31. Further, the second magnetic body 22 forms the protrusion 33, which protrudes toward the first magnetic body 21, at a radial position corresponding to the narrow portion 31. The magnetic detection unit 14 is disposed radially inward of the protrusions 32 and 33.

Figure 5:
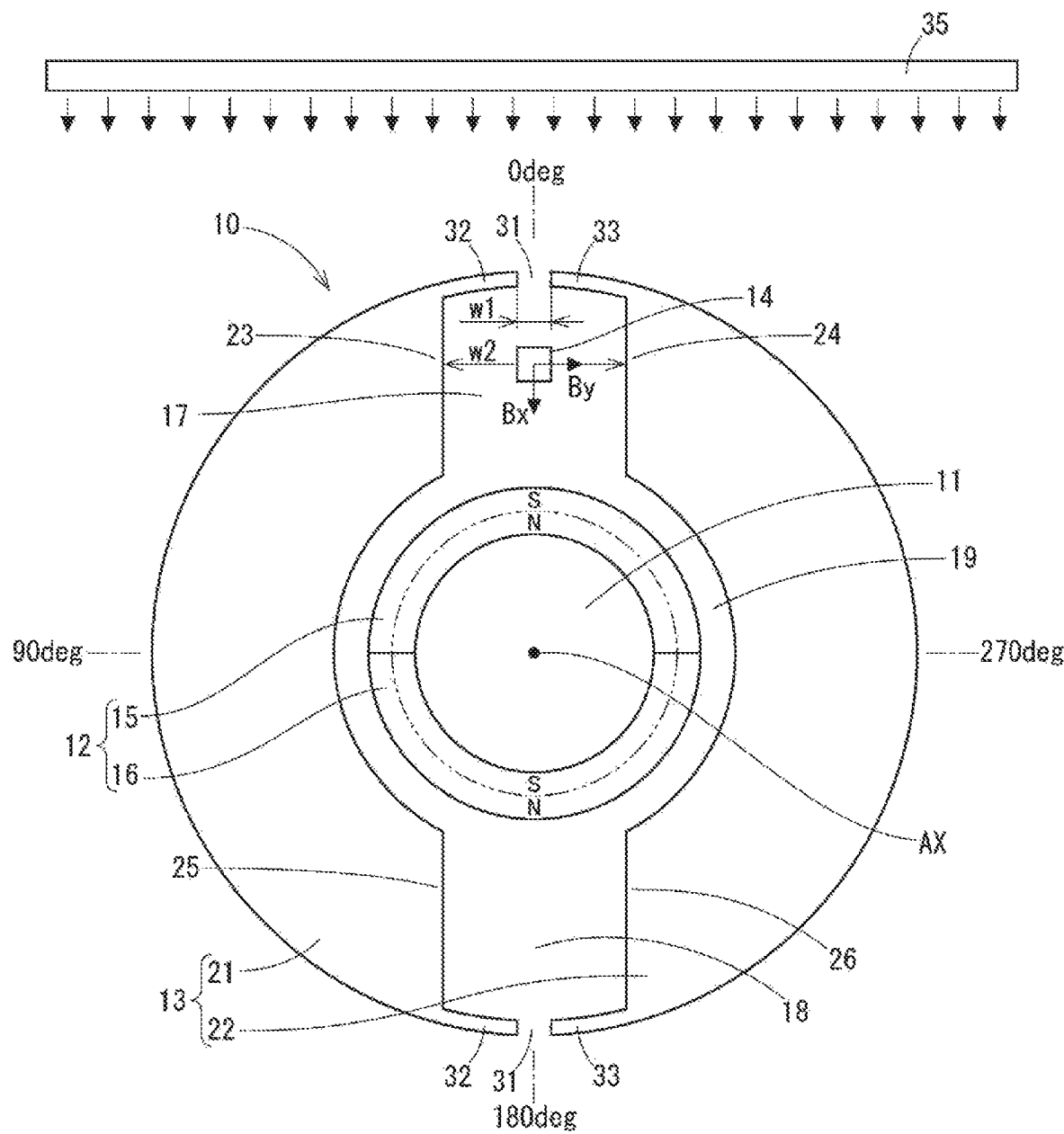
FIG. 5 is a diagram showing a rotation angle detection device and a disturbance magnet arranged outside the rotation angle detection device in the first embodiment.

Here, the influence of the disturbance magnet 35 on the radial magnetic flux component of the magnetic field at the detection position will be described with reference to FIGS. 5 and 6. The disturbance magnet 35 generates a disturbance magnetic field, and is disposed outside the rotation angle detection device 10. In FIG. 5, the disturbance magnet 35 is arranged at a position radially outward with respect to the particular gap 17, specifically at a position where the rotation angle of the rotating body 11 would measure 0 deg.

Figure 6:
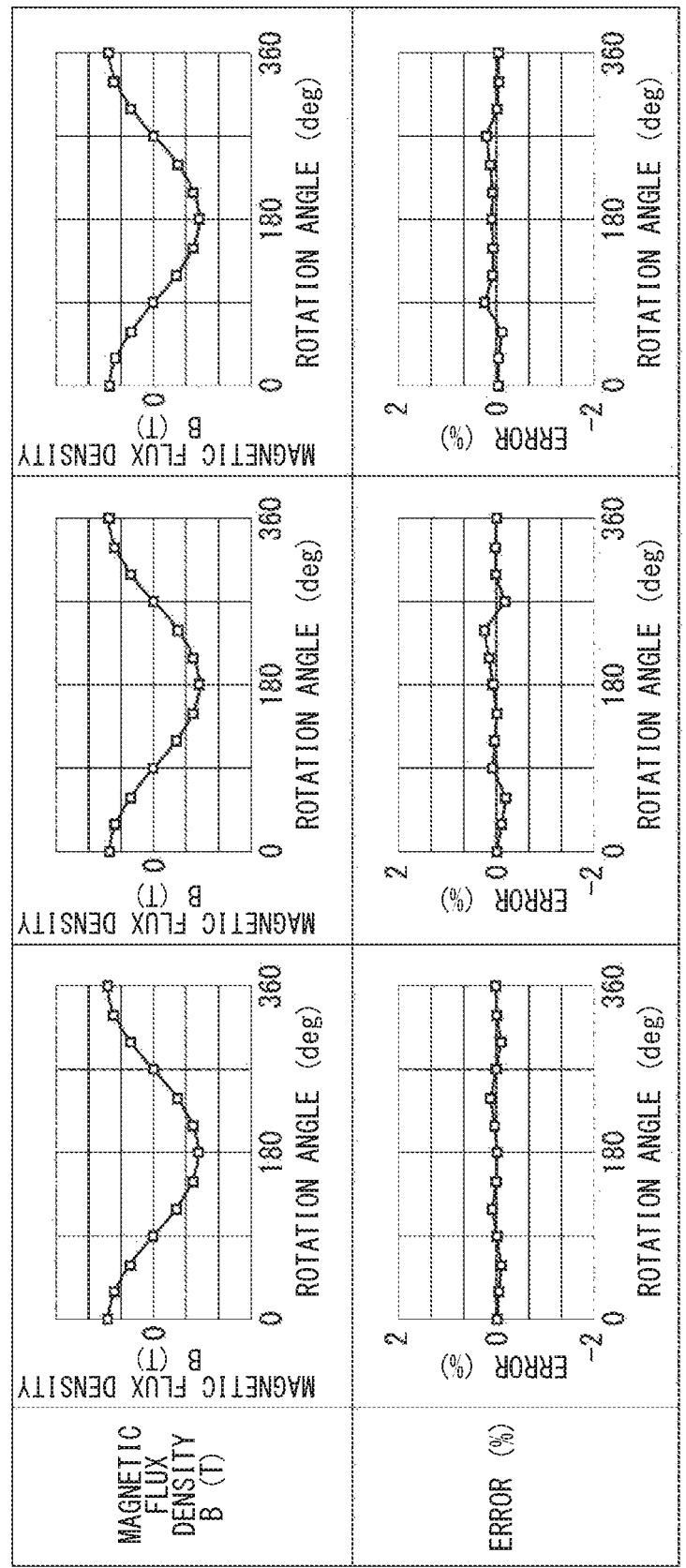
FIG. 6 is a diagram showing a relationship between rotation angle of a rotating body and a radial magnetic flux component, and a relationship between rotation angle of a rotating body and error with respect to an ideal waveform, for both presence and absence of a disturbance magnet.

The upper half of FIG. 6 shows the relationship between the rotation angle of the rotating body 11 and the radial magnetic flux component for: when the disturbance magnet 35 is not provided, when the disturbance magnet 35 is provided at the 0 deg position, and when the disturbance magnet 35 is provided at the 90 deg position. The lower half of FIG. 6 shows an error between the radial magnetic flux component detected by the magnetic detection unit 14 and an ideal waveform. From these relationships, it can be seen that the radial magnetic flux component detected by the magnetic detection unit 14 is not affected by the disturbance magnet 35. The protrusions 32 and 33 have a function of shielding the magnetic detection unit 14 from the disturbance magnetic field.

Effects

As described above, in the first embodiment, the rotation angle detection device 10 includes the magnet 12, the magnetic portion 13, and the magnetic detection unit 14. The magnet 12 has poles arranged in a radial direction perpendicular to the rotation axis AX of the rotating body 11, and rotates together with the rotating body 11. The magnetic portion 13 is arranged in a ring shape radially outward with respect to the magnet 12, and has gaps 17 and 18 at a plurality of positions along the circumferential direction. The magnetic detection unit 14 is disposed in one particular gap 17 of the plurality of gaps 17 and 18 and is configured to detect a tangential magnetic flux component and a radial magnetic flux component of a magnetic field. The tangential width w1 of the narrow portion 31 of the particular gap 17 located radially outward with respect to the detection position is smaller than the detection position gap width w2.

Therefore, a 360° rotation angle of the rotating body 11 can be calculated by performing an arc tangent operation based on the Sin waveform signal and the Cos waveform from the detection values of the magnetic detection unit 14. In addition, the magnetic detection unit 14 is disposed in the particular gap 17 of the ring-shaped magnetic portion 13, and the tangential width w1 of the particular gap 17 radially outward of the magnetic detection unit 14 is relatively narrow. As a result, the effect of the disturbance magnetic field on the radial magnetic flux component detected by the magnetic detection unit 14 can be sufficiently reduced. Therefore, detection accuracy is improved.

In the first embodiment, the magnetic portion 13 includes a plurality of magnetic bodies 21 and 22. The particular gap 17 is formed between the end portion 23 of the first magnetic body 21 and the end portion 24 of the second magnetic body 22. The magnetic bodies 21 and 22 include the protrusions 32 and 33 that are formed radially outward of the detection position, and that are formed to project along the tangential direction. As a result, the tangential width w1 of a part of the particular gap 17 (that is, the narrow portion 31) located radially outward with respect to the magnetic detection unit 14 can be formed to be relatively narrow.

Second Embodiment

Figure 7:
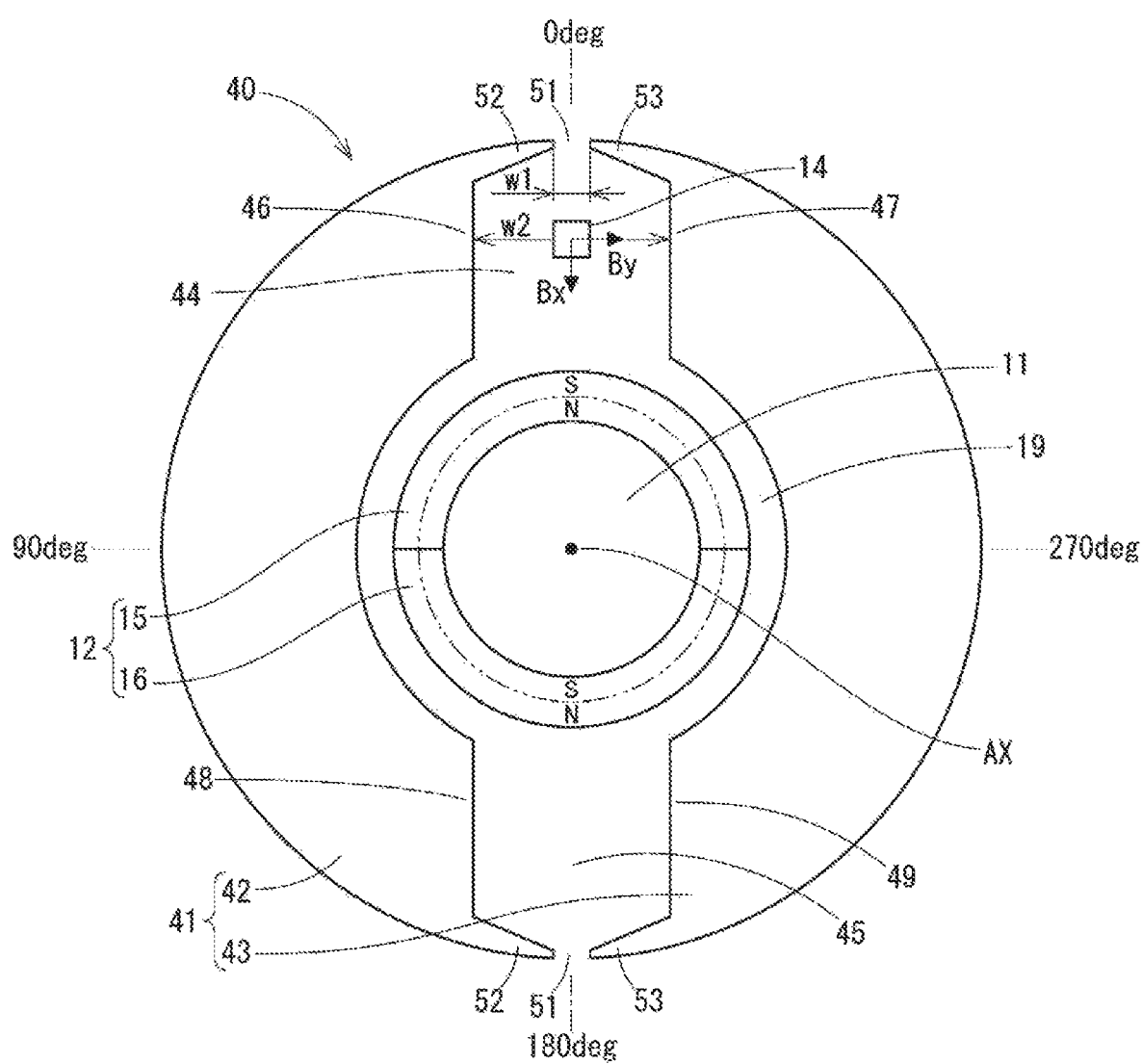
FIG. 7 is a schematic diagram schematically showing a rotation angle detection device according to a second embodiment.

In the second embodiment, as shown in FIG. 7, the magnetic portion 41 of the rotation angle detecting device 40 includes a first magnetic body 42 and a second magnetic body 43. A gap 44 is formed between an end portion 46 of the first magnetic body 42 and an end portion 47 of the second magnetic body 43. Further, a gap 45 is formed between an end portion 48 of the first magnetic body 42 and an end portion 49 of the second magnetic body 43.

The narrow portion 51 of the particular gap 44 is formed between a protrusion 52 of the first magnetic body 42 and a protrusion 53 of the second magnetic body 43. The protrusions 52 and 53 have a tapered shape. That is, the protrusions 52 and 53 are formed so as to gradually become thinner from their proximal base to the distal tip. Therefore, the magnetic bodies 42 and 43 can be easily manufactured by machining. In particular, since the root angles of the protrusions 52 and 53 are relatively large, wear and failure of the press die can be reduced.

Third Embodiment

Figure 8:
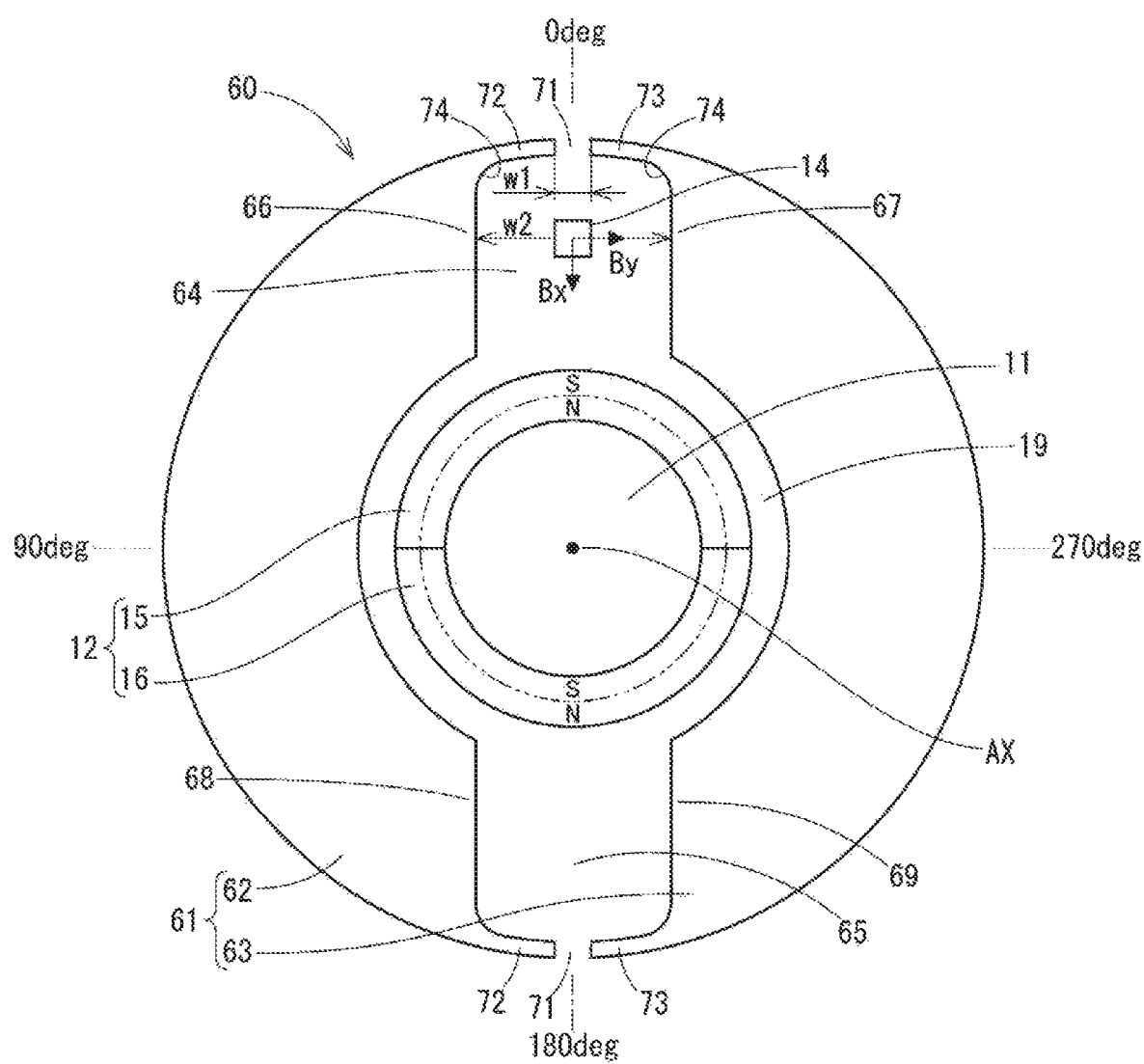
FIG. 8 is a schematic diagram schematically showing a rotation angle detection device according to a third embodiment.

In the third embodiment, as shown in FIG. 8, the magnetic portion 61 of the rotation angle detecting device 60 includes a first magnetic body 62 and a second magnetic body 63. A gap 64 is formed between an end portion 66 of the first magnetic body 62 and an end portion 67 of the second magnetic body 63. Further, a gap 65 is formed between an end portion 68 of the first magnetic body 62 and an end portion 69 of the second magnetic body 63.

The narrow portion 71 of the particular gap 64 is formed between a protrusion 72 of the first magnetic body 62 and a protrusion 73 of the second magnetic body 63. The corners 74 at the bases of the protrusions 72 and 73 are round. Therefore, the magnetic bodies 62 and 63 are easily manufactured by machining. In particular, with regard to the die for press working, wear and failure of a portion corresponding to the corner 74 at the base of the protrusions 72 and 73 can be reduced.

Fourth Embodiment

Figure 9:
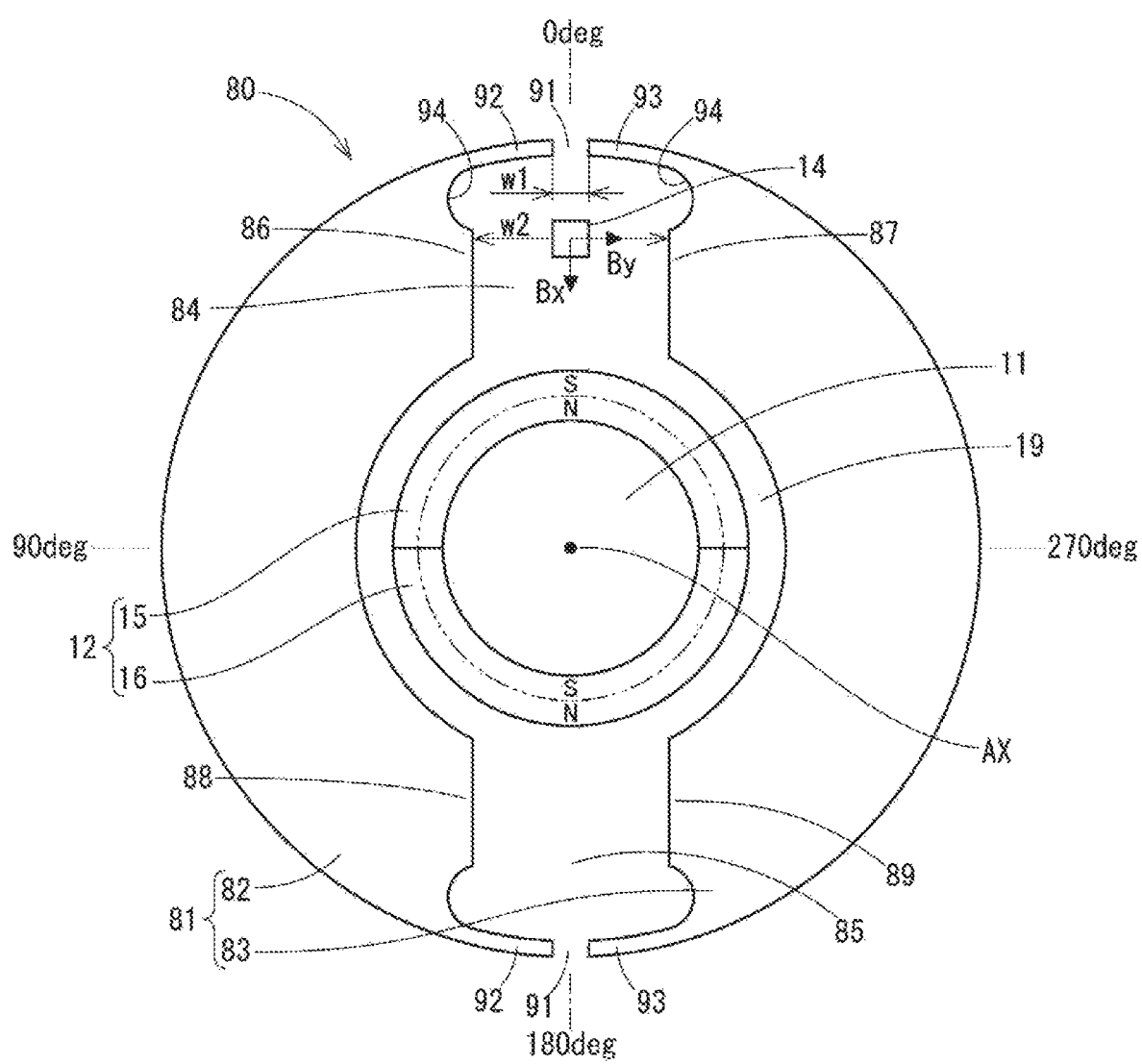
FIG. 9 is a schematic diagram schematically showing a rotation angle detection device according to a fourth embodiment.

In the fourth embodiment, as shown in FIG. 9, the magnetic portion 81 of the rotation angle detecting device 80 includes a first magnetic body 82 and a second magnetic body 83. A gap 84 is formed between an end portion 86 of the first magnetic body 82 and an end portion 87 of the second magnetic body 83. Further, a gap 85 is formed between an end portion 88 of the first magnetic body 82 and an end portion 89 of the second magnetic body 83.

The narrow portion 91 of the particular gap 84 is formed between a protrusion 92 of the first magnetic body 82 and a protrusion 93 of the second magnetic body 83. A concave portion 94 is formed on each of the end portions 86 to 89 adjacent to the base of the protrusions 92 and 93, the concave portion 94 being recessed away from the gaps 84 and 85. The concave portion 94 corresponds to the corner at the base of the protrusions 92 and 93 and has a round shape. Therefore, the magnetic bodies 82 and 83 are easily manufactured by machining. In particular, with regard to the die for press working, wear and failure of a portion corresponding to the concave portion 94 can be reduced. Further, the presence of the concave portion 94 reduces disturbance of the magnetic field at the detection position as compared with the first to third embodiments having no concave portion.

Fifth Embodiment

Figure 10:
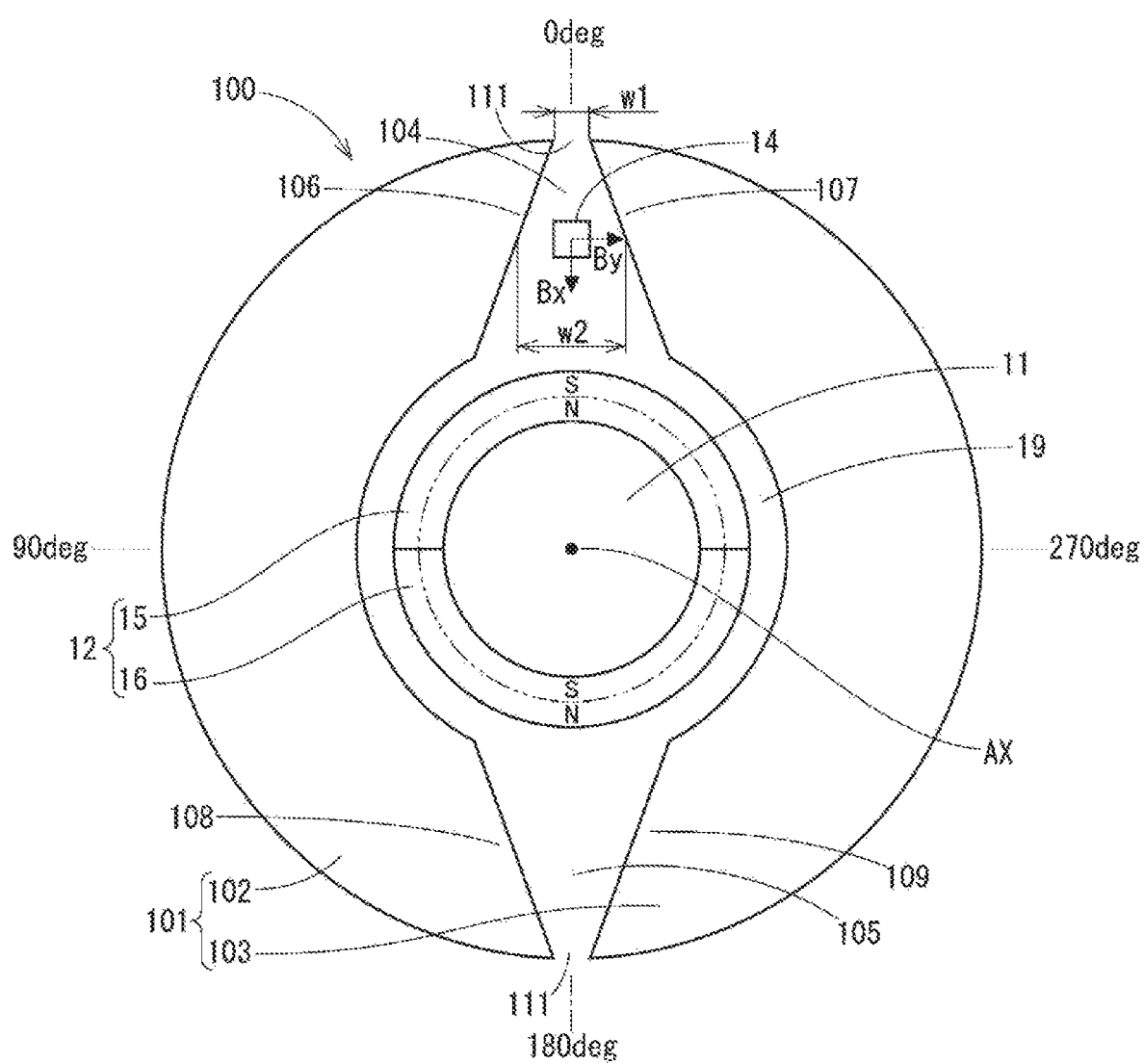
FIG. 10 is a schematic diagram schematically showing a rotation angle detection device according to a fifth embodiment.

In the fifth embodiment, as shown in FIG. 10, the magnetic portion 101 of the rotation angle detection device 100 includes a first magnetic body 102 and a second magnetic body 103. A gap 104 is formed between an end portion 106 of the first magnetic body 102 and an end portion 107 of the second magnetic body 103. Further, a gap 105 is formed between an end portion 108 of the first magnetic body 102 and an end portion 109 of the second magnetic body 103.

The end portions 106 to 109 are formed so as to protrude toward the other magnetic body in an inclined manner from the inner side in the radial direction to the outer side in the radial direction. As a result, the tangential direction widths of the gaps 104 and 105 becomes narrower in a continuous manner along the radially outward direction. The narrow portion 111 of the particular gap 104 is formed between the tip of the end portion 106 and the tip of the end portion 107. In this manner, the tangential width w1 of the narrow portion 111 of the particular gap 104 may be configured to be smaller than the detection position gap width w2. Further, since the tangential width of the particular gap 104 is continuously narrowed toward the radially outer side, there is an effect that the gain of the tangential magnetic flux component detected by the magnetic detection unit 14 is relatively high.

Sixth Embodiment

Figure 11:
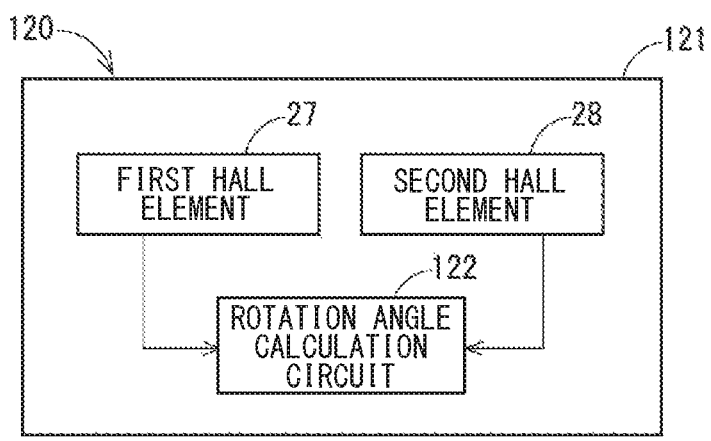
FIG. 11 is a block diagram illustrating a magnetic detection unit of a rotation angle detection device according to a sixth embodiment.

In the sixth embodiment, as shown in FIG. 11, the magnetic detection unit 121 of the rotation angle detection device 120 has a rotation angle calculation circuit 122 that calculates the rotation angle of the rotating body. When the rotation angle range of the rotating body is divided into a first range and a second range, the rotation angle calculation circuit 122 uses the detection value from the second Hall element 28, corresponding to the tangential magnetic flux component, to determine whether the rotation angle of the rotating body falls within the first range or the second range. In the sixth embodiment, the first range is a range of 0 to 180°, and the second range is a range of 180 to 360°. If the detection value of the second Hall element 28 is negative, it is determined that the rotation angle range of the rotating body is within 0 to 180°, and if the detection value of the second Hall element 28 is positive, It is determined that the rotation angle range is within 180° to 360°. Further, the rotation angle calculation circuit 122 calculates the rotation angle of the rotating body using the detection value of the first Hall element 27 corresponding to the radial magnetic flux component.

By using the tangential magnetic flux component only for distinguishing between the first range and the second range in this way, even when the tangential magnetic flux component is affected by a disturbance magnetic field, the rotation angle detection accuracy does not decrease. The radial magnetic flux component, which is sufficiently protected from the influence of the disturbance magnetic field, is used to calculate the rotation angle. As a result, detection accuracy is improved.

Seventh Embodiment

In the first to sixth embodiments, the influence of the disturbance magnetic field on the radial magnetic flux component detected by the magnetic detection unit is reduced by the characteristics of the magnetic portion, and the rotation angle detection accuracy is improved. On the other hand, there is another concern in that the detection value fluctuates due to aging of the magnetic detection unit, and the detection accuracy of the rotation angle may decrease due to this. In the seventh embodiment, an object is to provide a rotation angle detection device in which a decrease in rotation angle detection accuracy due to aging deterioration is reduced.

Figure 12:
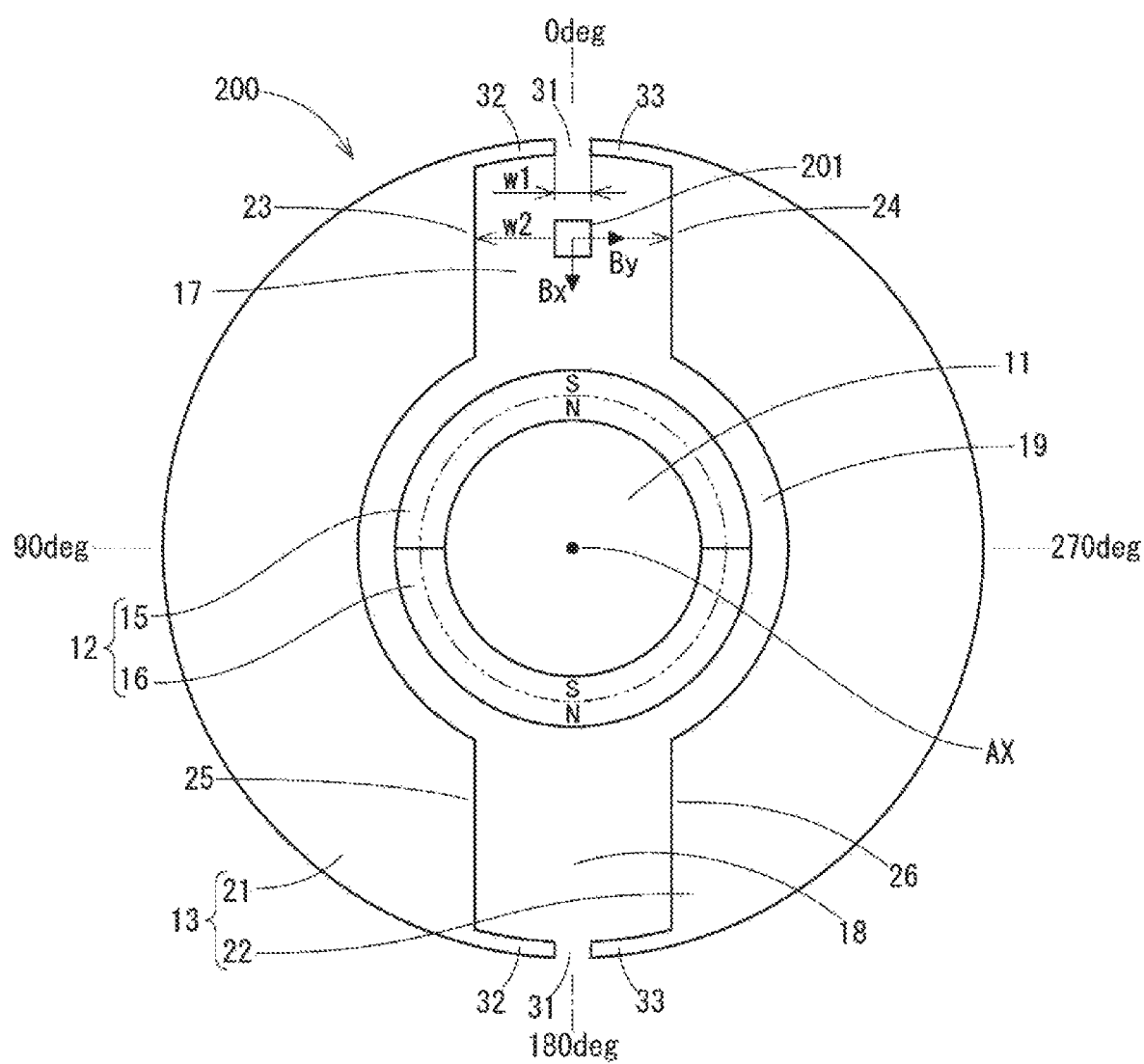
FIG. 12 is a schematic diagram schematically showing a rotation angle detection device according to a seventh embodiment.
Figure 13:
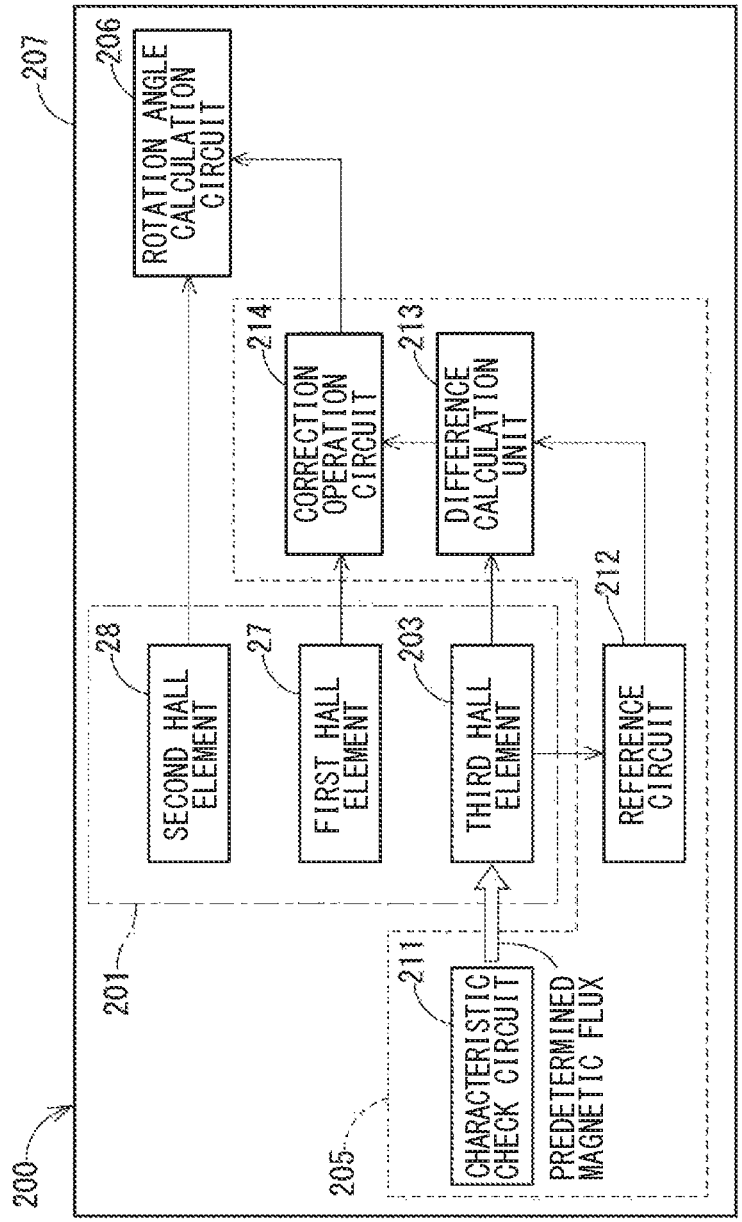
FIG. 13 is a block diagram illustrating a magnetic detection unit according to a seventh embodiment.
Figure 14:
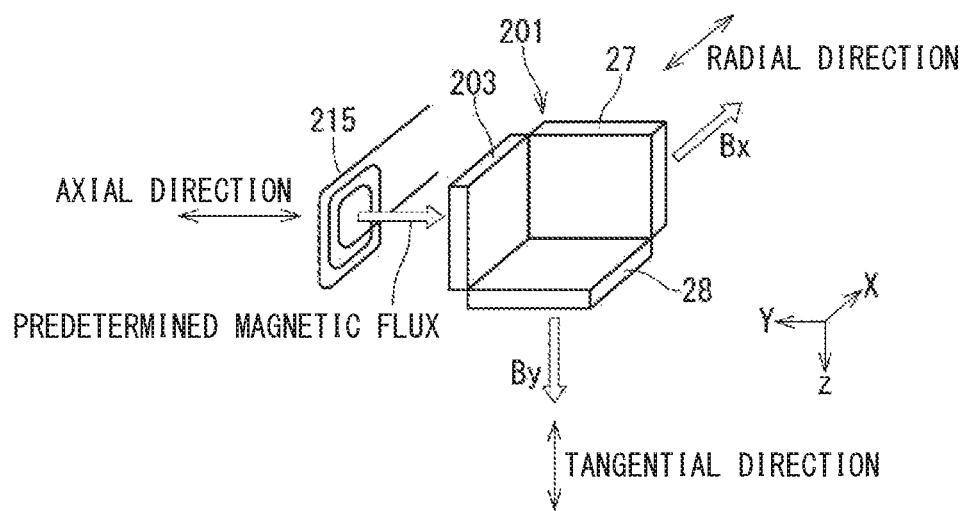
FIG. 14 is a schematic diagram of a magnetic detection unit according to a seventh embodiment.

The rotation angle detection device 200 according to the seventh embodiment shown in FIG. 12 includes the magnetic detection unit 201. As shown in FIG. 13, the magnetic detection unit 201 includes a first Hall element 27 as a first detection element, a second Hall element 28 as a second detection element, and a third Hall element 203 as a third detection element. The third Hall element 203 detects a magnetic flux component of the magnetic field in a predetermined direction at the detection position. In the seventh embodiment, the predetermined direction is a direction orthogonal to the tangential direction and the radial direction as shown in FIG. 14, i.e., the axial direction. That is, the third Hall element 203 is arranged so as to be able to detect the axial magnetic flux component of the magnetic field at the detection position.

The first Hall element 27 is a vertical Hall element. The second Hall element 28 is a horizontal Hall element. The third Hall element 203 has the same element configuration as the first Hall element 27, i.e., is a vertical Hall element. The magnetic detection unit 201 is a three-axis magnetic sensor that measures magnetism in the X-axis direction corresponding to the radial direction, the Y-axis direction corresponding to the tangential direction, and the Z-axis direction corresponding to the axial direction.

Returning to FIG. 13, the magnetic detection unit 201 is enclosed in a package 207 together with a deterioration correction unit 205 and a rotation angle calculation circuit 206. The deterioration correction unit 205 corrects any errors due to aging in the detection value of the first Hall element 27 based on the detection value of the third Hall element 203. The rotation angle calculation circuit 206 calculates a rotation angle based on the corrected detection value of the first Hall element 27 and the detection value of the second Hall element 28. The detection value of the third Hall element 203 is not used for calculating the rotation angle.

The deterioration correction unit 205 will be described in detail. The deterioration correction unit 205 includes a characteristic check circuit 211, a reference circuit 212, a difference calculation circuit 213, and a correction operation circuit 214.

The characteristic check circuit 211 applies a predetermined magnetic flux to the third Hall element 203 in order to check the characteristic of the third Hall element 203. For example, the characteristic check circuit 211 may include an inductor 215 as shown in FIG. 14, and generate a magnetic flux substantially perpendicular to the magneto-sensitive surface of the third Hall element 203 by sending a current through the inductor 215.

Hereinafter, the characteristic of the first Hall element 27, i.e., the relationship between the rotation angle and the detection value of the first Hall element 27, is referred to as a first Hall characteristic. Further, the characteristic of the third Hall element 203, i.e., the relationship between the angle equivalent value corresponding to rotation angle and the detection value of the third Hall element 203, is referred to as a third Hall characteristic. The predetermined magnetic flux generated by the characteristic check circuit 211 is set so that when applied to the third Hall element 203 during an initial period of use, the third Hall characteristic shows a Cos waveform like the first Hall characteristic. Here, the initial period of use may be defined as, for example, a period in which an inspection or the like is performed at a factory before product shipment. In other words, the initial period of use refers to a period prior to deterioration caused by aging.

Returning to FIG. 13, the reference circuit 212 has a non-volatile memory that stores data without needing power supply. The reference circuit 212 stores, as a reference value, a detection value of the third Hall element 203 when a predetermined magnetic flux is applied by the characteristic check circuit 211 during the initial stage of use of the rotation angle detection device 200. That is, the reference circuit 212 stores the initial third Hall characteristic.

Figure 15:
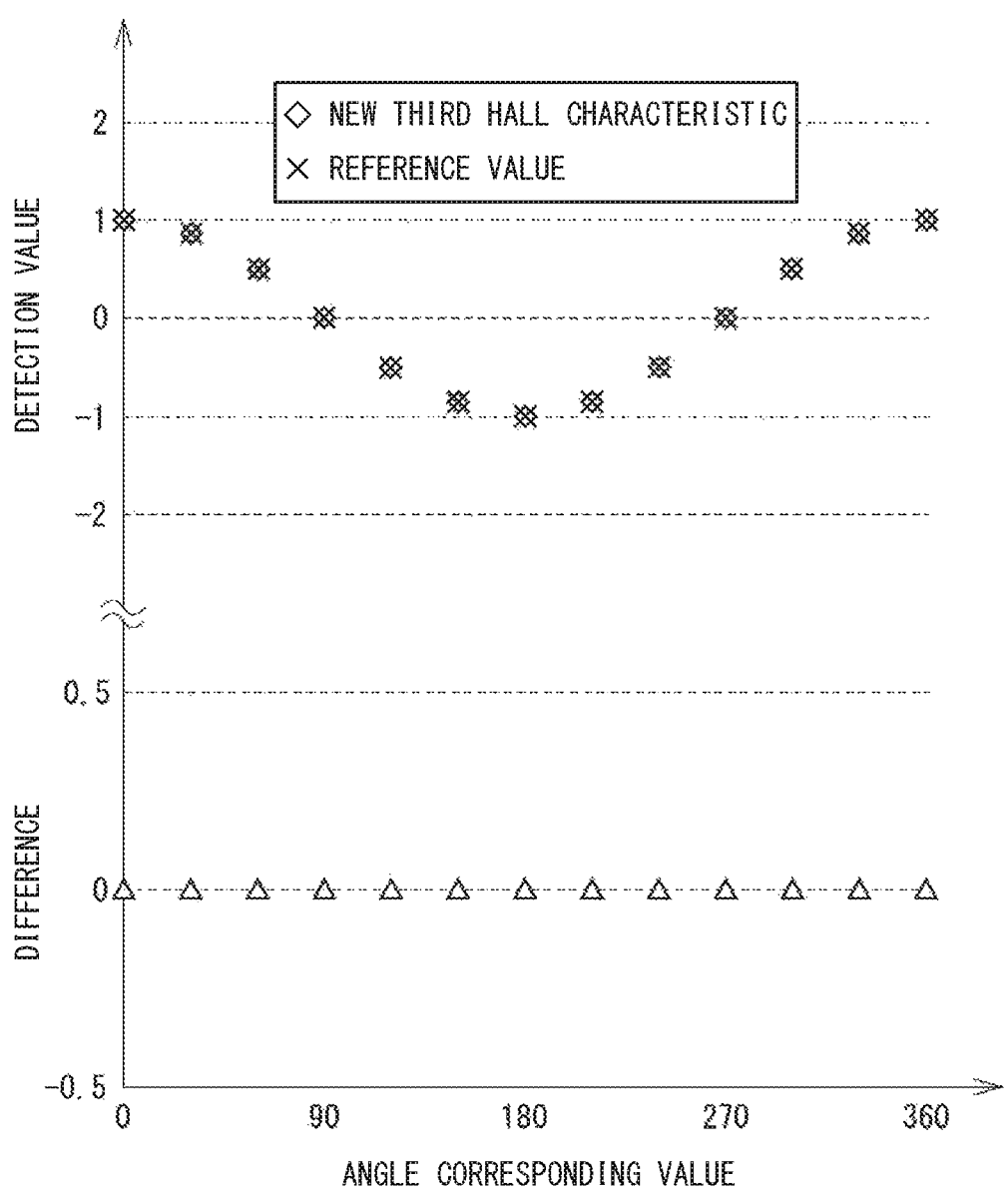
FIG. 15 is a diagram illustrating a detection value of a new third Hall element, a reference value, and a difference between them in the seventh embodiment.
Figure 16:
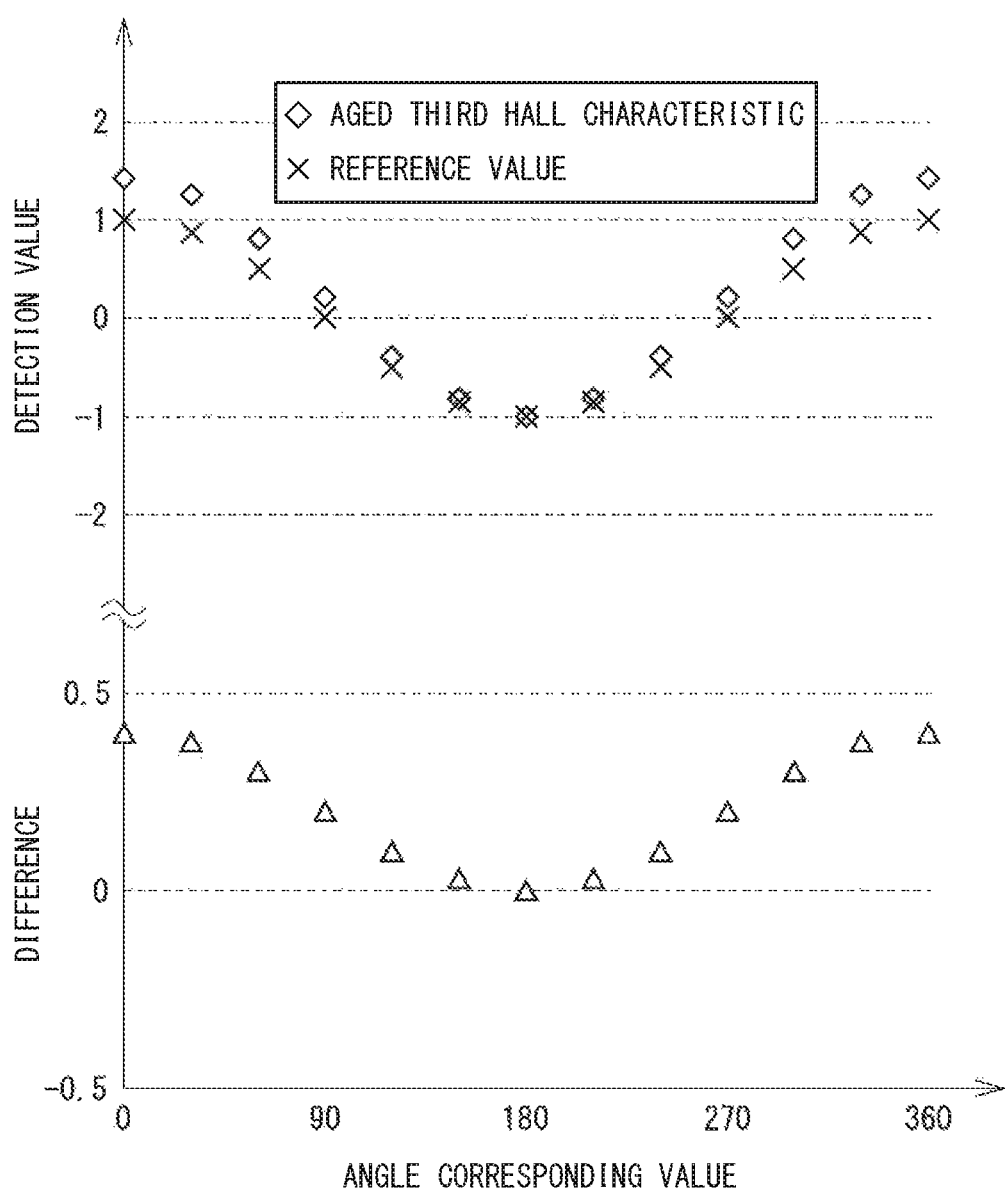
FIG. 16 is a diagram illustrating a detected value of an aged third Hall element, a reference value, and a difference between them in a seventh embodiment.

The difference calculation circuit 213 calculates the difference between the reference value and the detection value of the third Hall element 203 when a predetermined magnetic flux is applied by the characteristic check circuit 211, e.g., after the rotation angle detection device 200 has aged over time. The difference calculation circuit 213 has a non-volatile memory, and stores the calculated difference in association with the angle equivalent value. As shown in FIG. 15, the initial detection value of the third Hall element 203 does not differ from the reference value. Therefore, the difference between them is substantially zero. On the other hand, as shown in FIG. 16, the detection value of the third Hall element 203 after aging has a difference from the reference value at almost all angle equivalent values. Therefore, the difference between them is no longer 0. That is, the difference calculation circuit 213 calculates the amount of change in the third hall characteristic caused by aging deterioration.

The correction operation circuit 214 corrects the detection value of the first Hall element 27 based on the difference calculated by the difference calculation circuit 213 so as to reduce deviations caused by aging deterioration. That is, the correction operation circuit 214 assumes that the first Hall characteristic has deviated due to aging deterioration in a similar manner as the third Hall characteristic, and changes the detection value of the first Hall element 27 in accordance with the deviation tendency of the third Hall characteristic. Then, the correction operation circuit 214 offsets this deviation amount from the detection value of the first Hall element 27.

Effects

According to the seventh embodiment, a 360° rotation angle of the rotating body 11 can be calculated by performing an arc tangent operation based on the Sin waveform signal and the Cos waveform from the detection values of the magnetic detection unit 201. In addition, the magnetic detection unit 201 is disposed in the particular gap 17 of the ring-shaped magnetic portion 13, and the tangential width w1 of the particular gap 17 radially outward of the magnetic detection unit 201 is relatively narrow. As a result, the effect of the disturbance magnetic field on the radial magnetic flux component detected by the magnetic detection unit 201 can be sufficiently reduced. Therefore, detection accuracy is improved.

In the seventh embodiment, the magnetic detection unit 201 includes a first detection element 27 that detects a radial magnetic flux component of a magnetic field, a second detection element 28 that detects a tangential magnetic flux component, and a third Hall element 203 for detecting a predetermined direction magnetic flux component, at the location where the magnetic detection unit 201 is disposed. The rotation angle detection device 200 further includes a deterioration correction unit 205 and a rotation angle calculation circuit 206. The deterioration correction unit 205 corrects any errors due to aging in the detection value of the first Hall element 27 based on the detection value of the third Hall element 203 which is not used for calculating the rotation angle. The rotation angle calculation circuit 206 calculates a rotation angle based on at least the corrected detection value of the first Hall element 27. As a result, the effects of aging can be reduced.

In the seventh embodiment, the third Hall element 203 has the same element configuration as the first Hall element 27. The deterioration correction unit 205 includes a characteristic check circuit 211, a reference circuit 212, a difference calculation circuit 213, and a correction operation circuit 214. The characteristic check circuit 211 applies a predetermined magnetic flux to the third Hall element 203. The reference circuit 212 stores, as a reference value, a detection value of the third Hall element 203 when the predetermined magnetic flux is applied during an initial period of use. The difference calculation circuit 213 calculates the difference between the reference value and the detection value of the third Hall element 203 when a predetermined magnetic flux is applied, e.g., after the rotation angle detection device 200 has aged over time. The correction operation circuit 214 corrects the detection value of the first Hall element 27 based on this difference so as to reduce deviations caused by aging. Thus, it is possible to calculate the amount of change in the detection value of the first Hall element 27 due to aging and offset this difference.

In the seventh embodiment, the characteristic check circuit 211 includes the inductor 215. Thus, by applying a current to the inductor 215, the magnetic flux applied to the third Hall element 203 can be controlled.

In the seventh embodiment, the third Hall element 203 is an element arranged to detect a magnetic flux component in a direction orthogonal to the tangential direction and the radial direction. This makes it possible to reduce the surface area of the detection elements by utilizing a three-axis magnetic sensor, in which the detection element on the axis not used for calculating the rotation angle is used to correct the deterioration.

Eighth Embodiment

Figure 17:
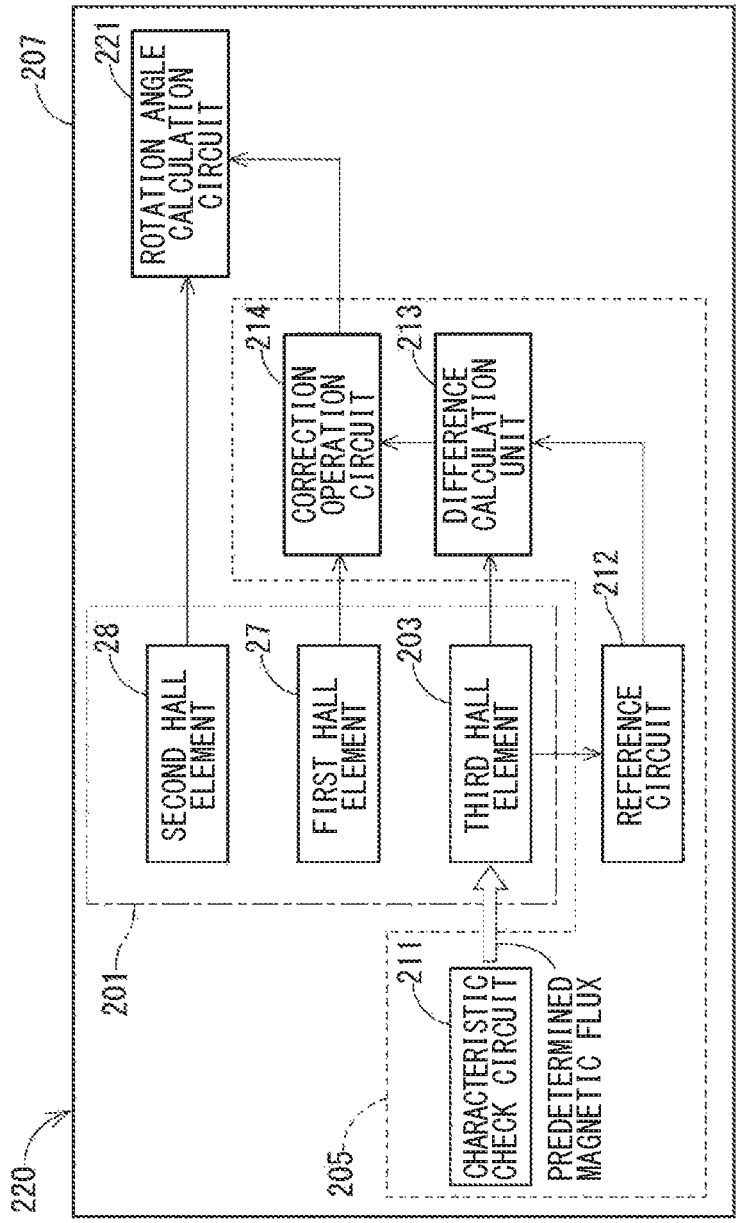
FIG. 17 is a block diagram illustrating a rotation angle detection device according to an eighth embodiment.

In the eighth embodiment, as shown in FIG. 17, the rotation angle calculation circuit 221 of the rotation angle detection device 220 uses the detection value of the second Hall element 28 in a similar manner as the rotation angle calculation circuit 122 of the sixth embodiment, i.e., to determine whether the rotation angle belongs in the first range or the second range. Next, the rotation angle is calculated using the corrected detection value of the first Hall element 27 that was corrected by the deterioration correction unit 205.

By using the detection value corresponding to the tangential magnetic flux component only for distinguishing between the first range and the second range in this way, even when the tangential magnetic flux component is affected by a disturbance magnetic field, the rotation angle detection accuracy does not decrease. The detection value corresponding to the radial magnetic flux component, which is sufficiently protected from the influence of the disturbance magnetic field, is used to calculate the rotation angle. As a result, detection accuracy is improved.

Ninth Embodiment

Figure 18:
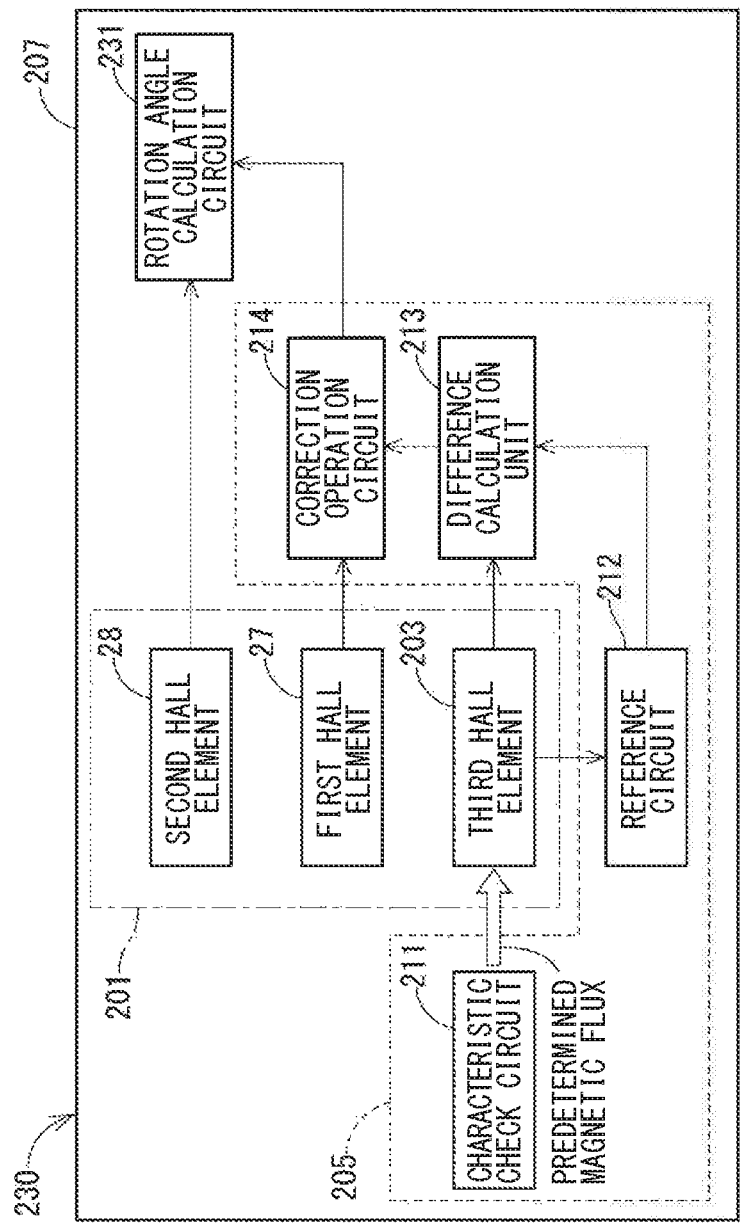
FIG. 18 is a block diagram illustrating a rotation angle detection device according to a ninth embodiment.

In the ninth embodiment, as shown in FIG. 18, the rotation angle calculation unit 231 of the rotation angle detection device 230 calculates the magnitude of the corrected detection value of the second Hall element 28 based on the corrected detection value of the first Hall element 27 corrected by the deterioration correction unit 205 by using the relationship of Expression (1). In equation (1), Bx is the radial magnetic flux component, and By is the tangential magnetic flux component.

$$Bx^2 + By^2 = 1 \quad (1)$$

Next, the rotation angle calculation unit 231 uses the detection value of the second Hall element 28 to determine whether the calculated corrected detection value of the second Hall element 28 is positive or negative. Finally, the rotation angle calculation unit 231 calculates the rotation angle by performing an arc tangent calculation based on the corrected detection value of the first Hall element 27 and the corrected detection value of the second Hall element 28. In this regard, the detection value corresponding to the radial magnetic flux component, which is sufficiently protected from the influence of the disturbance magnetic field, as well as the detection value corresponding to the tangential magnetic flux component which is calculated based thereon, are used to calculate the rotation angle. As a result, detection accuracy is improved.

Tenth Embodiment

Figure 19:
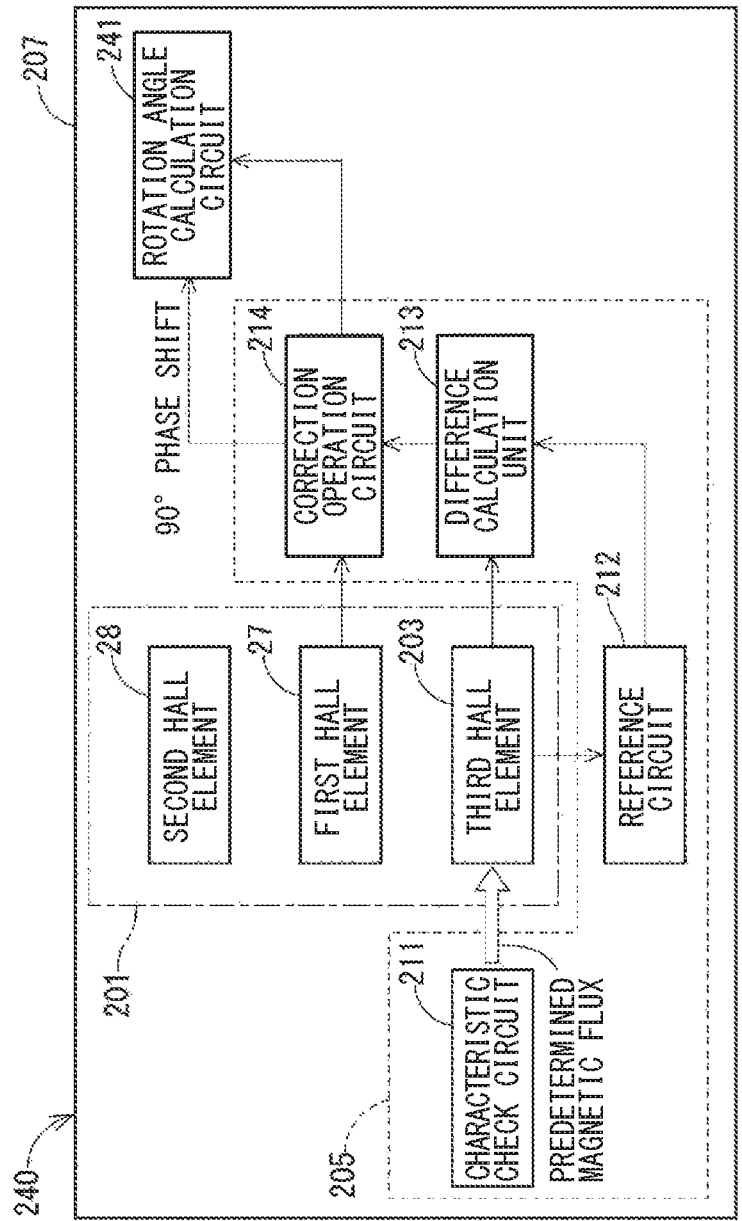
FIG. 19 is a block diagram illustrating a rotation angle detection device according to a tenth embodiment.

In the tenth embodiment, as shown in FIG. 19, the rotation angle calculation unit 241 of the rotation angle detection device 240 calculates the rotation angle by performing an arc tangent calculation based on the corrected detection value of the first Hall element 27 and a value equal to the corrected detection value of the first Hall element 27 phase shifted by 90°. The phase of the corrected detection value of the first Hall element 27 shifted by 90° corresponds to the detection value of the second Hall element 28. In this regard, the detection value corresponding to the radial magnetic flux component, which is sufficiently protected from the influence of the disturbance magnetic field, is used to calculate the rotation angle. As a result, detection accuracy is improved.

Eleventh Embodiment

Figure 20:
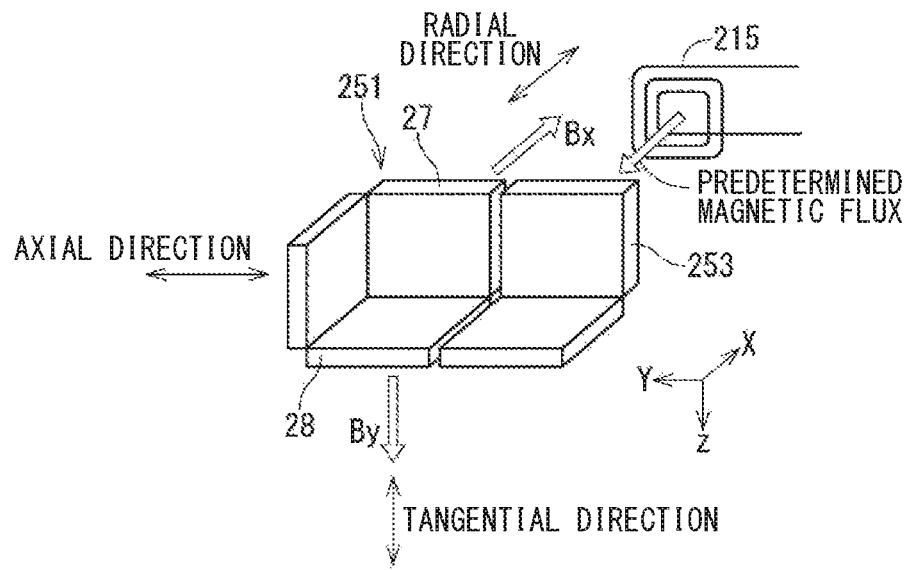
FIG. 20 is a schematic diagram of a magnetic detection unit according to an eleventh embodiment.

In the eleventh embodiment, as shown in FIG. 20, the third Hall element 253 of the magnetic detector 251 is arranged in parallel with the first Hall element 27. As described above, the third Hall element 253 used for deterioration correction may be provided separately from the magnetic sensor including the first Hall element 27 used for calculating the rotation angle. By providing an element exclusively for deterioration correction, the correction accuracy can be improved.

Twelfth Embodiment

Figure 21:
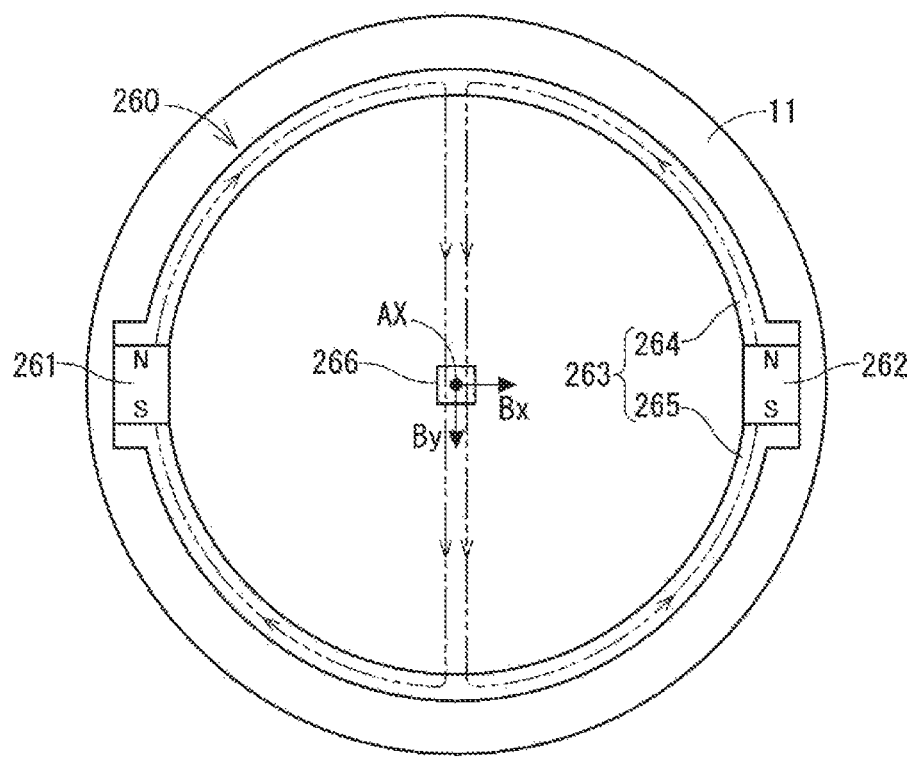
FIG. 21 is a schematic diagram schematically showing a rotation angle detection device according to a twelfth embodiment.

In the twelfth embodiment, as shown in FIG. 21, the rotation angle detection device 260 includes two magnets 261 and 262 that rotate together with the rotating body 11, a magnetic portion 263 that forms a magnetic circuit through which the magnetic flux of the magnets 261 and 262 flows, and a magnetic detection unit 266 position in a magnetic field formed by the magnets 261 and 262. The magnetic portion 263 includes a first magnetic body 264 and a second magnetic body 265 arranged in a ring shape. The first magnetic body 264 and the second magnetic body 265 are each formed in an arc shape. The first magnetic body 264 is arranged to connect the N poles of the magnets 261 and 262. The second magnetic body 265 is arranged to connect the S poles of the magnets 261 and 262. The magnetic flux of the magnets 261 and 262 flows from the center of the first magnetic body 264 to the center of the second magnetic body 265 through the vicinity of the rotation axis AX of the rotating body 11. The magnetic detection unit 266 is provided near the rotation axis AX of the rotating body 11. The magnetic portion 263 is provided outward of the magnetic detection unit 266, and can reduce the influence of a disturbance magnetic field on a magnetic flux component detected by the magnetic detection unit 266.

Figure 22:
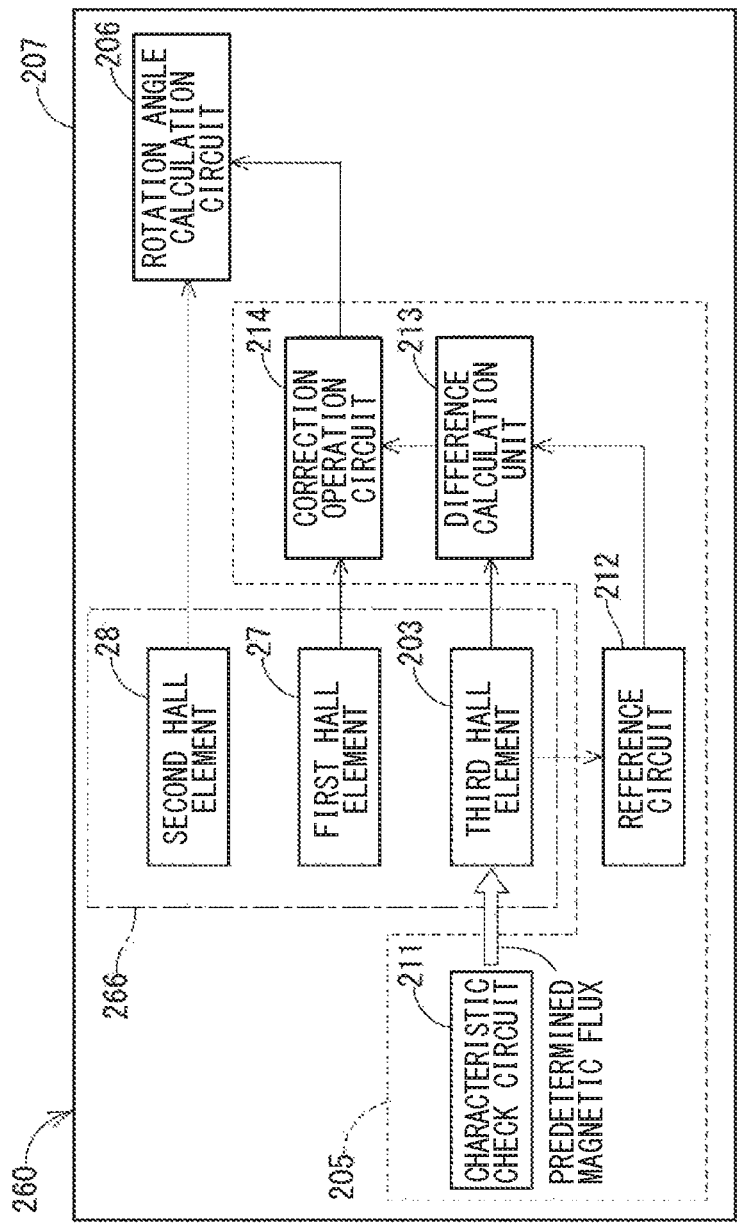
FIG. 22 is a block diagram illustrating a rotation angle detection device according to a twelfth embodiment.

As shown in FIG. 22, the magnetic detection unit 266 includes a first Hall element 27 that detects a first direction magnetic flux component, a second Hall element 28 that detects a second direction magnetic flux component, and a third Hall element 203 that detects a predetermined direction magnetic flux component, at the location where the magnetic detection unit 201 is disposed. The first direction corresponds to the radial direction of the seventh embodiment, the second direction corresponds to the tangential direction of the seventh embodiment, and the predetermined direction corresponds to the axial direction of the seventh embodiment. The other configurations of the magnetic detection unit 266 are the same as those of the seventh embodiment, such as being enclosed in a package 207 together with the deterioration correction unit 205 and the rotation angle calculation circuit 206.

As described above, as long as the influence of the disturbance magnetic field on the magnetic flux component detected by the magnetic detection unit 266 can be reduced, not only the magnetic portion 13 of the seventh embodiment but also the magnetic portion 263 as shown in FIG. 21 may be used. Nevertheless, as in the seventh embodiment, detection accuracy can be improved, and resistance to aging can be improved.

Other Embodiments

In another embodiment, the protrusion of the magnetic body may be tapered as in the second embodiment, and a recess may be formed at a location adjacent to the base of the protrusion as in the fourth embodiment.

Figure 23:
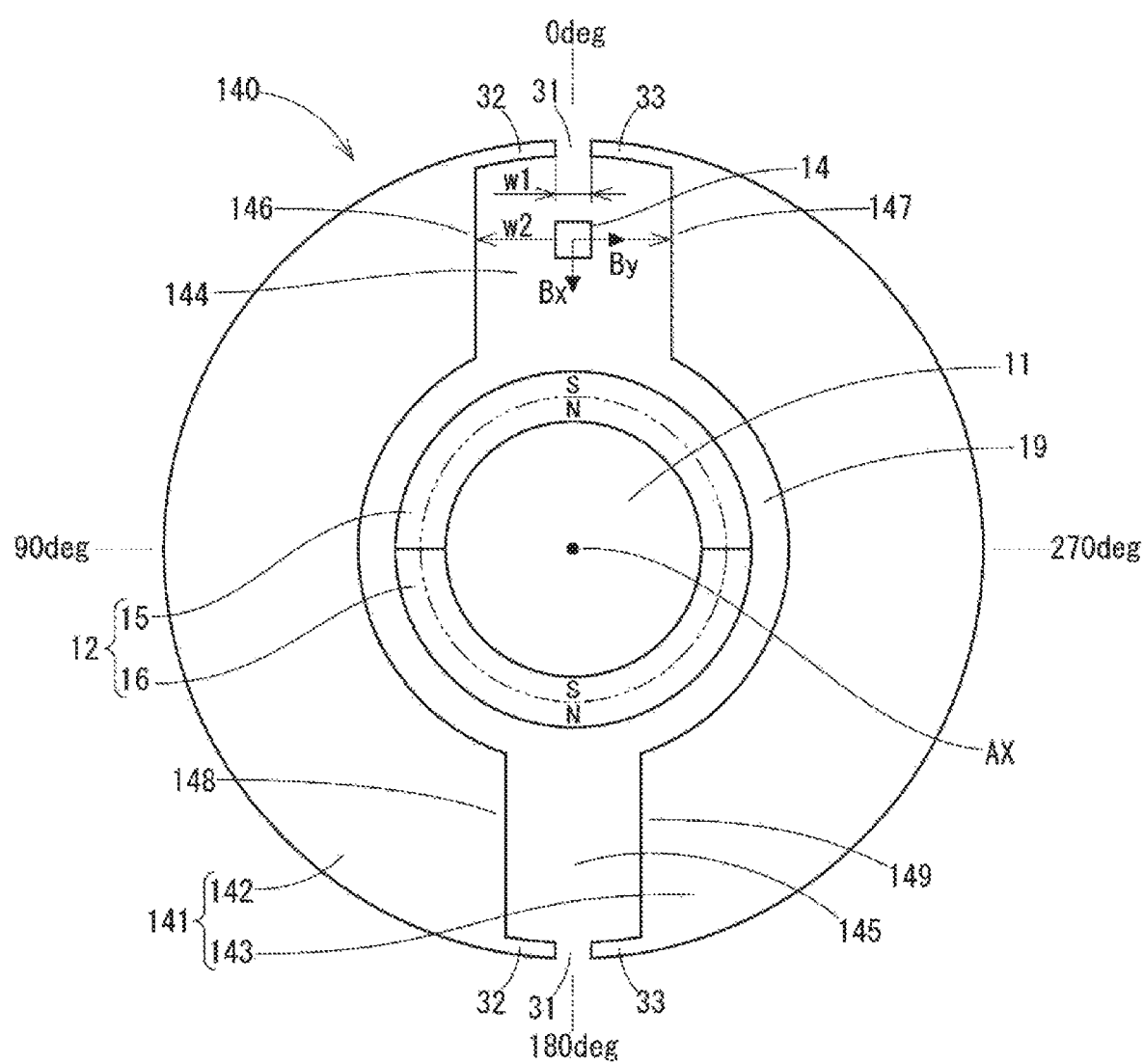
FIG. 23 is a schematic diagram schematically showing a rotation angle detection device according to a first other embodiment.

In other embodiments, the tangential direction widths of the gaps of the magnetic portion may be different from each other. For example, as shown in FIG. 23, the magnetic portion 141 of the rotation angle detection device 140 has a first magnetic body 142 and a second magnetic body 143. The particular gap 144 between the end portion 146 and the end portion 147 is larger than the gap 145 between the end portion 148 and the end portion 149. In addition, in other embodiments, the particular gap may be smaller than the other gap.

Figure 24:
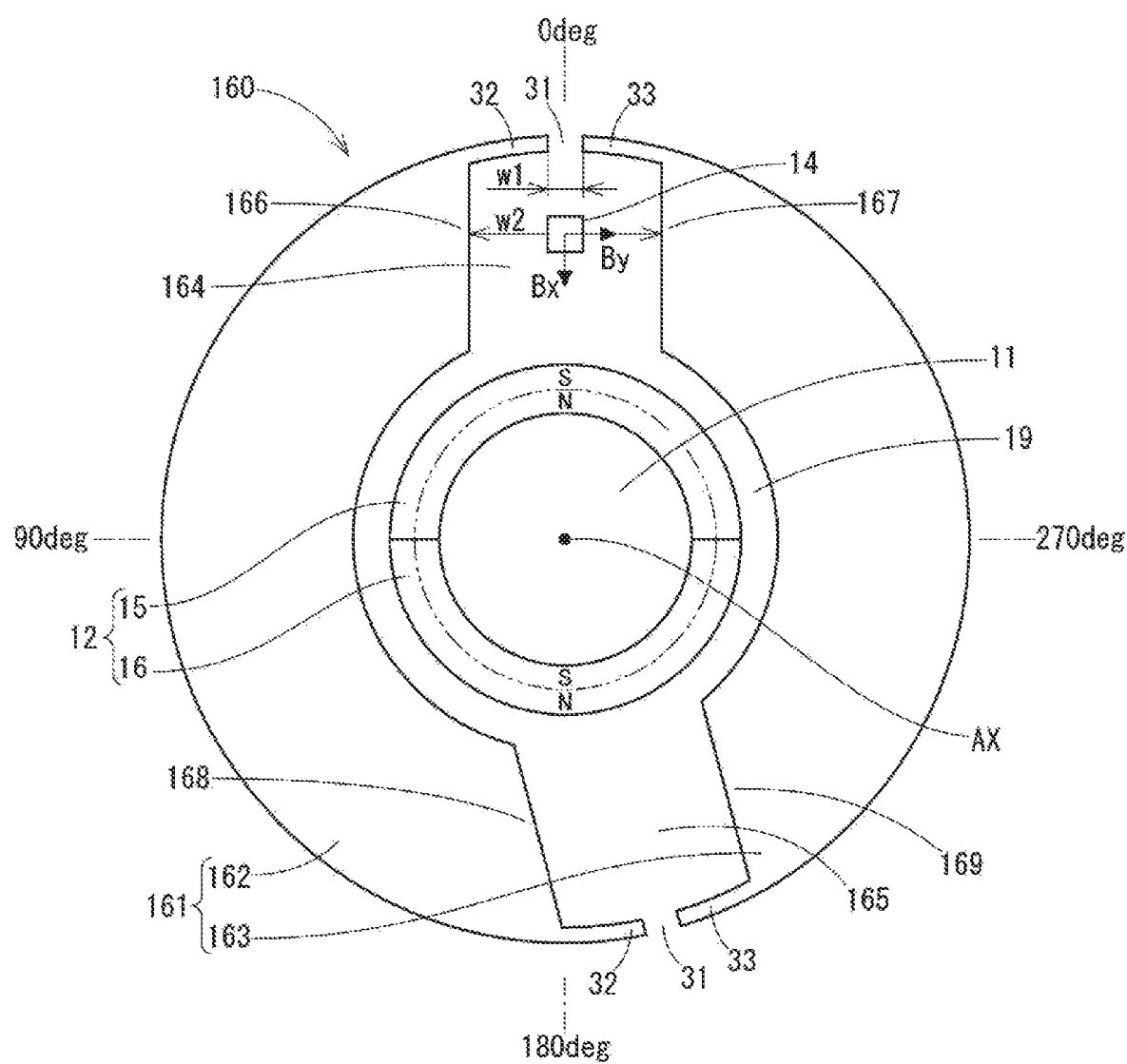
FIG. 24 is a schematic diagram schematically showing a rotation angle detection device according to a second other embodiment.

In another embodiment, the gaps of the magnetic portion may not be provided point-symmetrically with respect to the rotation axis. For example, as shown in FIG. 24, the magnetic portion 161 of the rotation angle detecting device 160 has a first magnetic body 162 and a second magnetic body 163. The particular gap 164 between the end portion 166 and the end portion 167 is provided at a position deviated from a position directly opposite to the gap 165 between the end portion 168 and the end portion 169 with the rotation axis AX interposed therebetween.

In other embodiments, the magnet may be comprised of one annular magnet. Further, in another embodiment, the magnet is not limited to having two magnet portion, and may be formed of three or more magnet portions. Further, the arrangement and magnetization of each magnet portion are not limited to those described above. In short, the magnet only needs to have a pole arranged in the radial direction perpendicular to the rotation axis of the rotating body.

In another embodiment, the rotation angle calculation circuit and the deterioration correction unit may be provided outside the magnetic detection unit instead of within the magnetic detection unit. In another embodiment, the rotation angle calculation circuit and the deterioration correction unit may be packaged separately from the magnetic detection unit. In another embodiment, the magnetic detection unit is not limited to a Hall element, and may use another magnetic sensor such as an MR element. Further, the magnetic detection unit may detect the tangential magnetic flux component and the radial magnetic flux component with a single element.

In another embodiment, each functional unit (that is, the characteristic check unit, the reference unit, the difference calculation unit, and the correction operation unit) included in the deterioration correction unit is not limited to being realized by hardware processing using a dedicated logic circuit. For example, these functional units may be implemented by software processing, i.e., a CPU configured to execute a program stored in a memory such as a computer-readable non-transitory recording medium. Further alternatively, these functional units may be implemented by a combination of both logic circuits and software. Which part of the functional units is implemented by hardware processing and which part is implemented by software processing can be appropriately selected.

The control circuit and method described in the present disclosure may be implemented by a special purpose computer which is configured with a memory and a processor programmed to execute one or more particular functions embodied in computer programs of the memory. Alternatively, the control circuit described in the present disclosure and the method thereof may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium.

The present disclosure has been described based on the embodiments. However, the present disclosure is not limited to the embodiments and structures. This disclosure also encompasses various modifications and variations within the scope of equivalents. Furthermore, various combination and formation, and other combination and formation including one, more than one or less than one element may be made in the present disclosure.

The invention claimed is:

1. A rotation angle detection device for detecting a rotation angle of a rotating body, comprising:
    a magnet having poles arranged along a radial direction perpendicular to a rotation axis of the rotating body, the magnet being disposed to rotate together with the rotating body;
    a magnetic portion provided in a ring shape radially outward of the magnet, a plurality of gaps being formed in the magnetic portion at a plurality of locations along a circumferential direction; and
    a magnetic detection unit arranged in a particular gap of the plurality of gaps, the magnetic detection unit being configured to detect a tangential magnetic flux component in a tangential direction and a radial magnetic flux component in the radial direction of a magnetic field, wherein
    the magnetic detection unit is located at a detection position,
    a width of the particular gap in the tangential direction at the detection position is defined as a detection position gap width,
    a width of the particular gap in the tangential direction at a position radially outward of the detection position is defined as a tangential width, and
    the tangential width is narrower than the detection position gap width.

2. The rotation angle detection device according to claim 1, wherein
    the magnetic portion includes a plurality of magnetic bodies,
    the particular gap is formed between two ends portions of the magnetic bodies, and
    the magnetic bodies include a protrusion that protrudes in the tangential direction, the protrusion being located radially outward of the detection position.

3. The rotation angle detection device according to claim 2, wherein the protrusions have a tapered shape.

4. The rotation angle detection device according to claim 2, wherein a corner at a base of the protrusions has a round shape.

5. The rotation angle detection device according to claim 2, wherein a concave portion that is recessed away from the particular gap is formed at the end portions of the magnetic bodies adjacent to a base of the protrusions.

6. The rotation angle detection device according to claim 1, wherein
    the magnetic portion includes a plurality of magnetic bodies,
    the particular gap is formed between two end portions of the magnetic bodies, and
    the end portions of the magnetic bodies are formed so as to protrude towards each other from a radially inner side to a radially outer side.

7. The rotation angle detection device according claim 1, further comprising:
    a rotation angle calculation unit that calculates the rotation angle of the rotating body, wherein
    a rotation angle range of the rotating body is divided into a first range and a second range, and
    the rotation angle calculation unit is configured to use a detection value of the magnetic detection unit corresponding to the tangential magnetic flux component to determine whether the rotation angle of the rotating body falls within the first range or the second range, and to use a detection value of the magnetic detection unit corresponding to the radial magnetic flux component to calculate the rotation angle of the rotating body.

8. The rotation angle detection device according to claim 1, wherein the magnet is a plurality of arc-shaped magnet portions or an annular magnet.

9. The rotation angle detection device according to claim 1, wherein the magnetic detection unit includes a first detection element that detects the radial magnetic flux component of the magnetic field at the detection location, a second detection element that detects the tangential magnetic flux component of the magnetic field at the detection location, and a third detection element that detects a predetermined direction magnetic flux component of the magnetic field at the detection location, and the rotation angle detection device further comprises:

a deterioration correction unit that corrects a detection value of the first detection element based on a detection value of the third detection element that is not used for rotation angle calculation so that deviations due to aging deterioration is reduced, and a rotation angle calculation unit that calculates the rotation angle of the rotating body based on at least the corrected detection value of the first detection element.

10. The rotation angle detection device according to claim 9, wherein the third detection element has the same element configuration as the first detection element, and the deterioration correction unit includes:

a characteristic check unit configured to apply a predetermined magnetic flux to the third detection element;

a reference unit that stores a detection value of the third detection element when the predetermined magnetic flux is applied during an initial period of use as a reference value;

a difference calculation unit that calculates a difference between the detection value of the third detection element and the reference value when the predetermined magnetic flux is applied after aging; and a correction operation unit that corrects the detection value of the first detection element based on the difference so that deviations due to aging deterioration is reduced.

11. The rotation angle detection device according to claim 9, wherein assuming that the radial magnetic flux component is Bx and the tangential magnetic flux component is By, the rotation angle calculation unit is configured to:

using an equation of "$Bx^2+By^2=1$", calculate a magnitude of a corrected detection value of the second detection element based on the corrected detection value of the first detection element, determining whether the corrected detection value of the second detection element is positive or negative using the detection value of the second detection element, and calculate the rotation angle of the rotating body using the corrected detection value of the first detection element and the corrected detection value of the second detection element.

12. The rotation angle detection device according to claim 9, wherein a rotation angle range of the rotating body is divided into a first range and a second range, and the rotation angle calculation unit is configured to use the detection value of the second detection element to determine whether the rotation angle of the rotating body falls within the first range or the second range, and to use the detection value of the first detection element to calculate the rotation angle of the rotating body.

13. The rotation angle detection device according to claim 9, wherein the rotation angle calculation unit is configured to calculate the rotation angle of the rotating body using the corrected detection value of the first detection element and a value obtained by shifting the phase of the corrected detection value of the first detection element by 90°.

14. The rotation angle detection device according to claim 10, wherein the characteristic check unit includes an inductor.

15. The rotation angle detection device according to claim 9, wherein the third detection element is arranged in parallel with the first detection element.

16. The rotation angle detection device according to claim 9, wherein the third detection element is arranged to detect a magnetic flux component in a direction orthogonal to the tangential direction and the radial direction.

17. A rotation angle detection device for detecting a rotation angle of a rotating body, comprising:

a magnet that rotates together with the rotating body;

a magnetic portion that forms a magnetic circuit through which the magnetic flux of the magnet flows;

a magnetic detection unit arranged within the magnetic field generated by the magnet including a first detection element that detects a first direction magnetic flux component of the magnetic field at an arrangement location, a second detection element that detects a second direction magnetic flux component of the magnetic field at the arrangement location, and a third detection element that detects a predetermined direction magnetic flux component of the magnetic field at the arrangement location;

a deterioration correction unit that corrects a detection value of the first detection element based on a detection value of the third detection element that is not used for rotation angle calculation so that deviations due to aging deterioration is reduced, and a rotation angle calculation unit that calculates the rotation angle of the rotating body based on at least the corrected detection value of the first detection element.

18. The rotation angle detection device according to claim 17, wherein the third detection element has the same element configuration as the first detection element, and the deterioration correction unit includes:

a characteristic check unit configured to apply a predetermined magnetic flux to the third detection element;

a reference unit that stores a detection value of the third detection element when the predetermined magnetic flux is applied during an initial period of use as a reference value;

a difference calculation unit that calculates a difference between the detection value of the third detection element and the reference value when the predetermined magnetic flux is applied after aging; and a correction operation unit that corrects the detection value of the first detection element based on the difference so that deviations due to aging deterioration is reduced.

19. The rotation angle detection device according to claim 17, wherein
assuming that the radial magnetic flux component is Bx and the tangential magnetic flux component is By,
the rotation angle calculation unit is configured to:
using an equation of "$Bx^2+By^2=1$", calculate a magnitude of a corrected detection value of the second detection element based on the corrected detection value of the first detection element,
determining whether the corrected detection value of the second detection element is positive or negative using the detection value of the second detection element, and
calculate the rotation angle of the rotating body using the corrected detection value of the first detection element and the corrected detection value of the second detection element.

20. The rotation angle detection device according to claim 17, wherein
a rotation angle range of the rotating body is divided into a first range and a second range, and
the rotation angle calculation unit is configured to use the detection value of the second detection element to determine whether the rotation angle of the rotating body falls within the first range or the second range, and to use the detection value of the first detection element to calculate the rotation angle of the rotating body.

21. The rotation angle detection device according to claim 17, wherein
the rotation angle calculation unit is configured to calculate the rotation angle of the rotating body using the corrected detection value of the first detection element and a value obtained by shifting the phase of the corrected detection value of the first detection element by 90°.

22. The rotation angle detection device according to claim 18, wherein the characteristic check unit includes an inductor.

23. The rotation angle detection device according to claim 17, wherein the third detection element is arranged in parallel with the first detection element.

24. The rotation angle detection device according to claim 17, wherein the third detection element is arranged to detect a magnetic flux component in a direction orthogonal to the first direction and the second direction.

\* \* \* \* \*